(12) United States Patent
Costa et al.

(10) Patent No.: US 10,930,075 B2
(45) Date of Patent: Feb. 23, 2021

(54) USER INTERFACE DISCOVERY AND INTERACTION FOR THREE-DIMENSIONAL VIRTUAL ENVIRONMENTS

(71) Applicant: MICROSOFT TECHNOLOGY LICENSING, LLC, Redmond, WA (US)

(72) Inventors: Carlos Fernando Faria Costa, Bellevue, WA (US); Mathew Julian Lamb, Seattle, WA (US); Brian Thomas Merrell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 15/785,041

(22) Filed: Oct. 16, 2017

(65) Prior Publication Data

US 2019/0114835 A1 Apr. 18, 2019

(51) Int. Cl.
*G06T 19/00* (2011.01)
*G06T 11/20* (2006.01)
(Continued)

(52) U.S. Cl.
CPC ............ *G06T 19/006* (2013.01); *G06F 3/011* (2013.01); *G06F 3/017* (2013.01);
(Continued)

(58) Field of Classification Search
CPC .......... G06F 3/011; G06F 3/012; G06F 3/013; G06F 3/017; G06F 3/0416;
(Continued)

(56) References Cited

U.S. PATENT DOCUMENTS 4,444,456 A 4/1984 Jain et al.
5,289,315 A 2/1994 Makita et al.
(Continued)

FOREIGN PATENT DOCUMENTS

CN 102444856 A 5/2012
CN 105929953 A 9/2016
(Continued)

OTHER PUBLICATIONS

VR GUI Input Module for Unity (HTC Vive) Jun. 4, 2016 (http://wacki.me/blog/2016/06/vr-gui-input-module-for-unity-htc-vive/).*
(Continued)

*Primary Examiner* — Jason A Pringle-Parker
(74) *Attorney, Agent, or Firm* — NovoTechIP International PLLC

(57) ABSTRACT

Devices, systems, and methods for interacting with a three-dimensional virtual environment, including receiving an input associated with a change in pose of a user's hand; estimating, based on at least the input, a first pose in the virtual environment for an input source associated with the hand; identifying a surface of a virtual object in the virtual environment; rendering a frame depicting elements of the virtual environment, the frame including a pixel rendered for a position on the surface; determining a distance between the position and a virtual input line extending through a position of the first pose and in a direction of the first pose; changing a pixel color rendered for the pixel based on the distance between the position and the virtual input line; and displaying the frame including the pixel with the changed pixel color to the user via a head-mounted display device.

17 Claims, 32 Drawing Sheets

(51) Int. Cl.
*G06F 3/01* (2006.01)
*G06F 3/0481* (2013.01)
(52) U.S. Cl.
CPC ........ *G06F 3/04815* (2013.01); *G06T 11/203* (2013.01); *G06F 2203/04802* (2013.01); *G06T 19/00* (2013.01)
(58) Field of Classification Search
CPC ............. G06F 3/04815; G06F 3/04842; G06F 3/04847; G06F 3/04883; G06F 3/0346; G06T 19/006; G02B 2027/0178; G02B 27/0172; H04N 21/4126
USPC ...................................................... 345/633, 8
See application file for complete search history.

(56) References Cited

U.S. PATENT DOCUMENTS

| | | | | |
|---|---|---|---|---|
| 5,790,124 | A * | 8/1998 | Fischer | G06T 15/10 345/473 |
| 6,918,087 | B1 * | 7/2005 | Gantt | G06F 3/04815 715/737 |
| 7,324,085 | B2 * | 1/2008 | Balakrishnan | G06F 3/04812 345/157 |
| 7,703,924 | B2 | 4/2010 | Nayar | |
| 8,063,900 | B1 | 11/2011 | O'Donnell | |
| 9,619,105 | B1 | 4/2017 | Dal Mutto | |
| 10,489,978 | B2 * | 11/2019 | Dimitrov | G06T 15/20 |
| 2002/0015064 | A1 * | 2/2002 | Robotham | G06F 3/0481 715/863 |
| 2003/0058241 | A1 | 3/2003 | Hsu | |
| 2007/0176908 | A1 * | 8/2007 | Lipman | G06F 3/0386 345/179 |
| 2008/0030461 | A1 * | 2/2008 | Matsui | G06F 3/011 345/156 |
| 2009/0153389 | A1 * | 6/2009 | Kerr | G06F 3/04883 341/176 |
| 2012/0013613 | A1 * | 1/2012 | Vesely | H04N 13/30 345/419 |
| 2012/0113223 | A1 * | 5/2012 | Hilliges | G06F 3/00 348/46 |
| 2012/0117514 | A1 * | 5/2012 | Kim | G06F 3/011 715/849 |
| 2013/0135288 | A1 | 5/2013 | King et al. | |
| 2013/0141434 | A1 | 6/2013 | Sugden et al. | |
| 2013/0194164 | A1 * | 8/2013 | Sugden | G02B 27/017 345/8 |
| 2013/0303285 | A1 * | 11/2013 | Kochi | G06T 19/006 463/32 |
| 2013/0336528 | A1 * | 12/2013 | Itani | G06F 3/017 382/103 |
| 2013/0342568 | A1 | 12/2013 | Ambrus et al. | |
| 2014/0071132 | A1 * | 3/2014 | Noshi | A61B 6/466 345/427 |
| 2015/0103011 | A1 | 4/2015 | Large et al. | |
| 2016/0106950 | A1 | 4/2016 | Vasapollo | |
| 2016/0357252 | A1 | 12/2016 | Gavriliuc et al. | |
| 2016/0378294 | A1 | 12/2016 | Wright et al. | |
| 2017/0038837 | A1 * | 2/2017 | Faaborg | G06T 7/70 |
| 2017/0060230 | A1 * | 3/2017 | Faaborg | G06F 3/011 |
| 2017/0060250 | A1 | 3/2017 | Nayak et al. | |
| 2017/0084083 | A1 * | 3/2017 | Wilson | G06T 19/006 |
| 2017/0168585 | A1 * | 6/2017 | Faaborg | G06F 3/013 |
| 2017/0220134 | A1 | 8/2017 | Burns | |
| 2017/0316607 | A1 * | 11/2017 | Khalid | G06T 19/006 |
| 2017/0329419 | A1 * | 11/2017 | Dearman | G06F 3/017 |
| 2017/0336882 | A1 * | 11/2017 | Tome | G06F 3/011 |
| 2017/0357333 | A1 * | 12/2017 | Balan | H04N 13/204 |
| 2018/0059780 | A1 * | 3/2018 | Mitchell | G06F 3/013 |
| 2018/0101986 | A1 | 4/2018 | Burns et al. | |
| 2018/0137602 | A1 * | 5/2018 | Spitzer | G02B 27/2228 |
| 2018/0288423 | A1 * | 10/2018 | Vembar | H04N 19/167 |

FOREIGN PATENT DOCUMENTS

| | | |
|---|---|---|
| JP | 2011203852 A | 10/2011 |
| WO | 2016197033 A1 | 12/2016 |

OTHER PUBLICATIONS

VR GUI Input Module for Unity (HTC Vive) Jun. 7, 2016 (https://www.youtube.com/watch?v=mD16LejMc9A).*

Adhikarla, et al., "Exploring Direct 3D Interaction for Full Horizontal Parallax Light Field Displays Using Leap Motion Controller", In Journal of Sensors, vol. 15, Issue 4, Apr. 2015, pp. 8642-8663.

"International Search Report and Written Opinion Issued in PCT Application No. PCT/US2018/054900", dated Dec. 7, 2018, 12 Pages.

Sands, et al., "Towards a Usable Stereoscopic Augmented Reality Interface for the Manipulation of Virtual Cursors", Published in the Second IEEE and ACM International Symposium on Mixed and Augmented Reality, 2003., Oct. 7, 2003, pp. 280-281.

Schemali, et al., "Design and Evaluation of Mouse Cursors in a Stereoscopic Desktop Environment", In IEEE Symposium On 3D User Interfaces (3DUI), Mar. 29, 2014, pp. 67-70.

Teather, et al., "Fishtank Fitts: A Desktop VR Testbed for Evaluating 3D Pointing Techniques", In Proceedings Extended Abstracts on Human Factors in Computing Systems, Apr. 26, 2014, pp. 519-522.

* cited by examiner

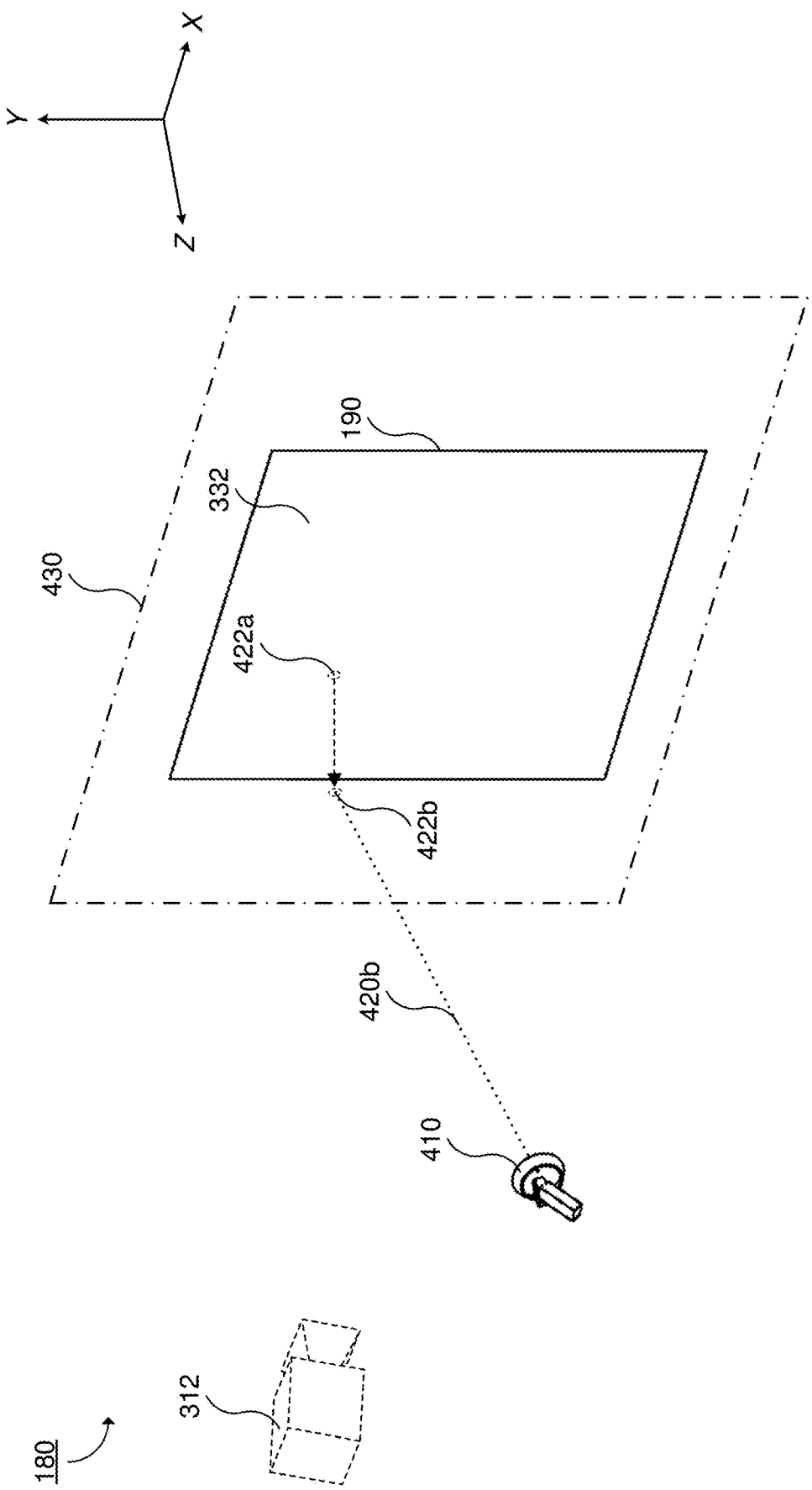

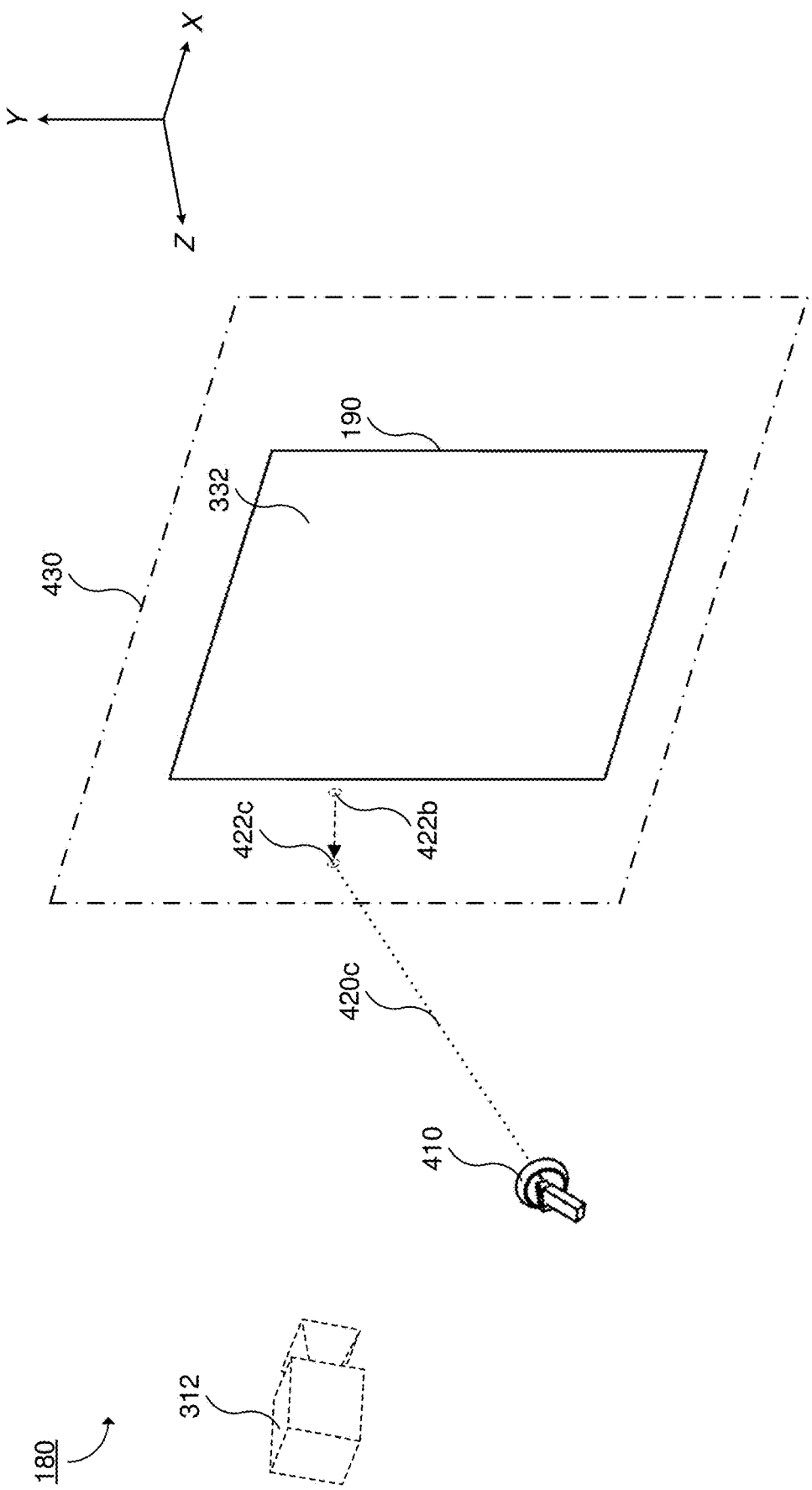

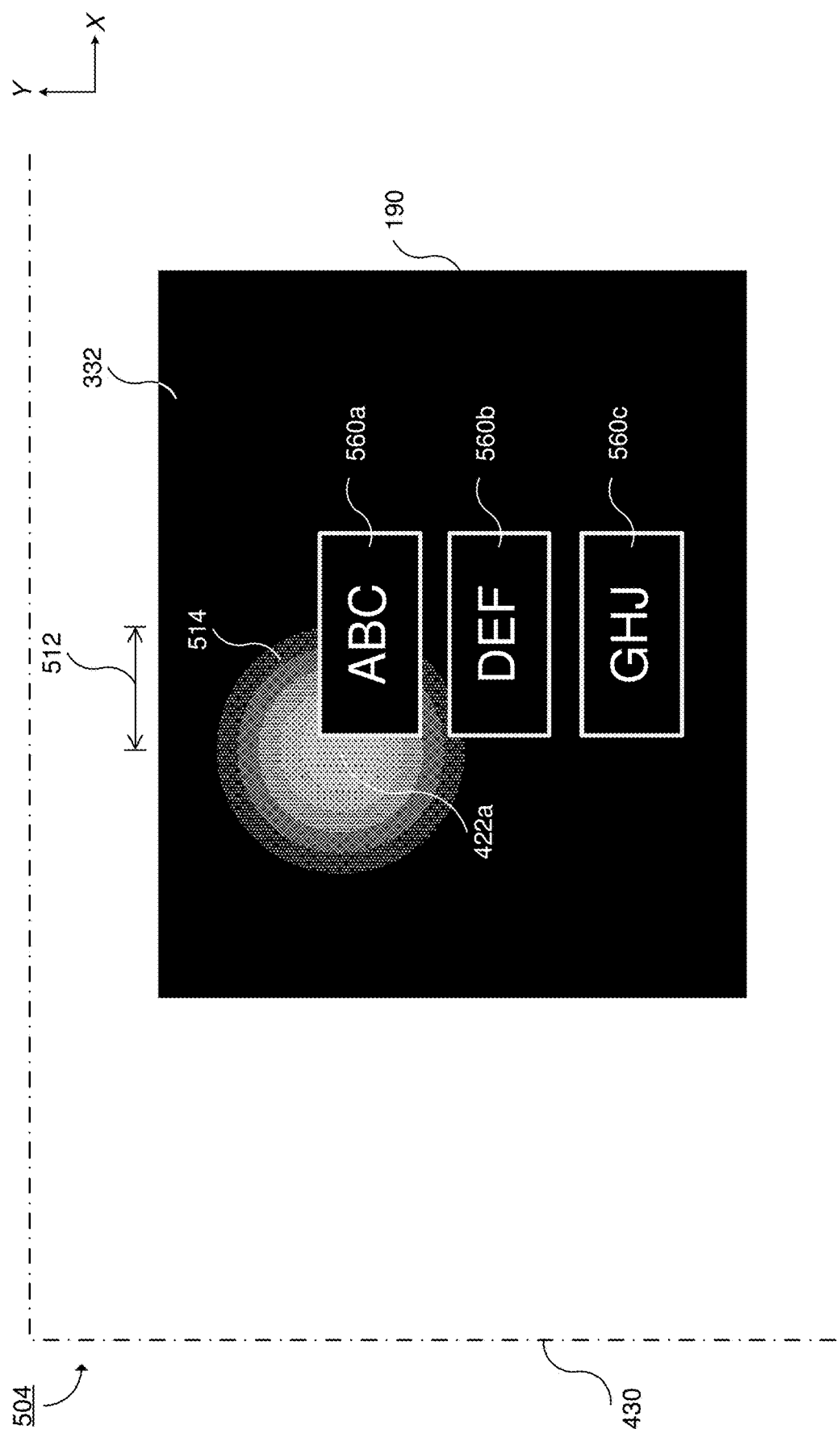

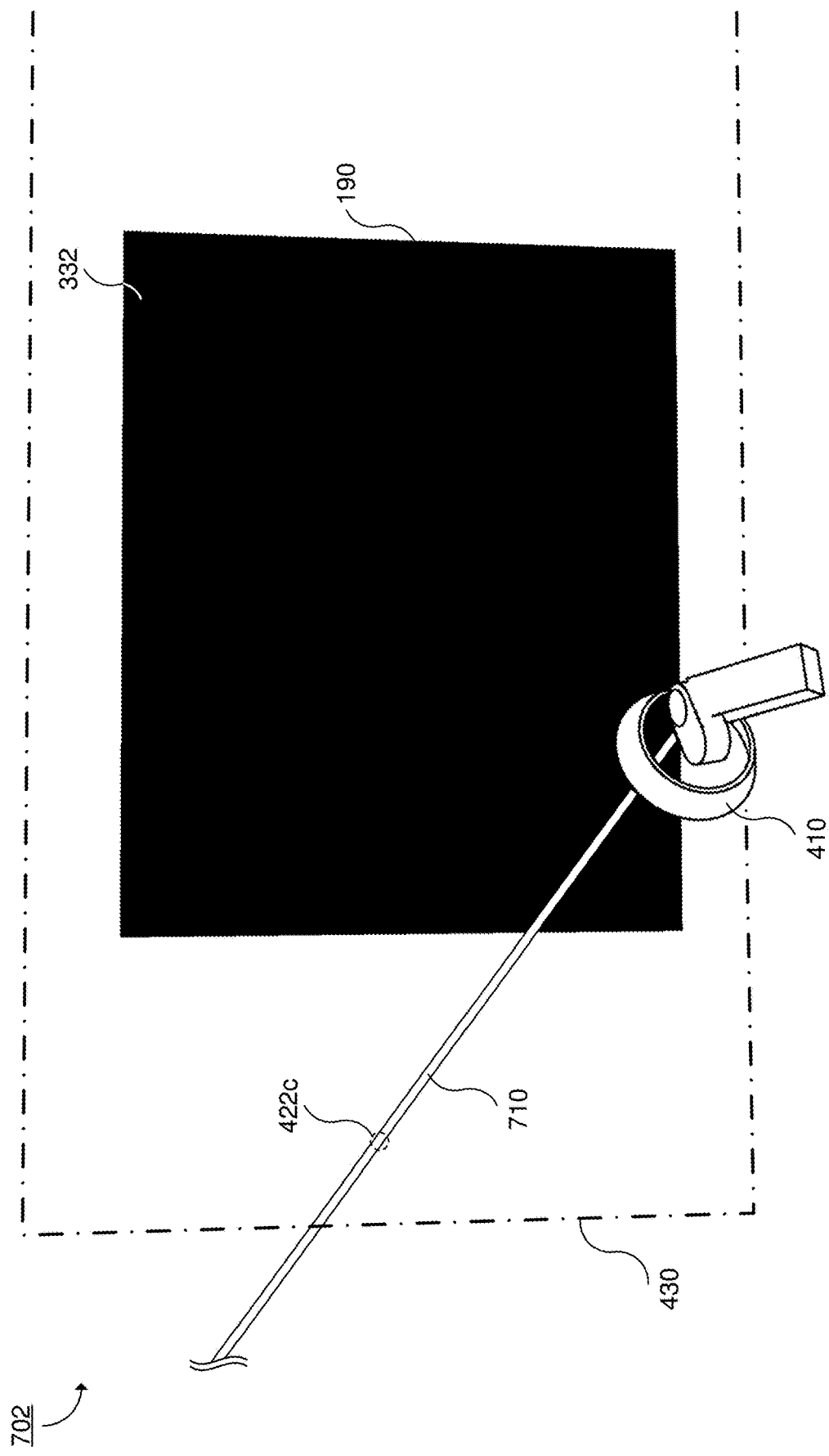

USER INTERFACE DISCOVERY AND INTERACTION FOR THREE-DIMENSIONAL VIRTUAL ENVIRONMENTS

BACKGROUND

Within a three-dimensional virtual environment, there can be complex arrangements of virtual objects, surfaces, and user-interactive elements that make it more difficult to identify and perform available and desired actions. When further combined with elements carried over from two-dimensional user interfaces, such as "flat" designs for user-interactive features, the discovery of new interactive elements, locating previously encountered elements, and effectively interacting with such elements can be more challenging than two-dimensional interfaces. Although handheld motion controllers offer certain improvements in speed and dexterity, there are still difficulties and inefficiencies arising from such controllers being held and operated away from the virtual camera axis and carryover of cursors similar to mouse cursors in two-dimensional environments that are not well suited for interacting in complex three-dimensional virtual environments.

Additionally, even on a simpler two-dimensional screen, it is somewhat common for users to lose track of a mouse cursor among other visual elements on the screen, leading to frustration, loss of time, and inefficiency. A common coping strategy is moving the mouse pointer to an extreme edge of the display. However, this strategy is unavailable in a virtual environment that lacks such boundaries. Another coping strategy is scanning the screen for the pointer, which becomes more challenging and time consuming in a three-dimensional virtual environment. Various features have been incorporated into operating systems to help identify mouse position, which serves to demonstrate the prevalence of the issue. However, triggering such features typically involves additional user actions, such as wiggling the mouse or pressing a key on a keyboard, which interrupts and slows down a user's interactions.

There is a need for improvements that allow users to navigate through and interact with three-dimensional virtual environments with greater certainty and efficiency.

SUMMARY

Systems for interacting with a three-dimensional virtual environment are disclosed. A system can include a head-mounted display device, a logic subsystem, and one or more machine readable media having instructions stored thereon which, when executed by the logic subsystem, cause the system to receive an input associated with a change in pose of a user's hand, and estimate, based on at least the received input, a first pose in the virtual environment for an input source associated with the user's hand. The instructions may also cause the system to identify a surface of a virtual object in the virtual environment, render a frame depicting elements of the virtual environment, the frame including a first pixel rendered for a first position on the surface, determine a first distance between the first position and a virtual input line extending through or from a position of the first pose in a direction of the first pose, change a first pixel color rendered for the first pixel based on the first distance between the first position and the virtual input line according to a first function of a distance to a virtual input line, and display the frame including the first pixel with the changed first pixel color to the user via the head-mounted display device.

In other aspects, methods for interacting with a three-dimensional virtual environment are disclosed. A method can include receiving an input associated with a change in pose of a user's hand, and estimating, based on at least the received input, a first pose in the virtual environment for an input source associated with the user's hand. The method may further include identifying a surface of a virtual object in the virtual environment, rendering a frame depicting elements of the virtual environment, the frame including a first pixel rendered for a first position on the surface, determining a first distance between the first position and a virtual input line extending through or from a position of the first pose in a direction of the first pose, changing a first pixel color rendered for the first pixel based on the first distance between the first position and the virtual input line according to a first function of a distance to a virtual input line, and displaying the frame including the first pixel with the changed first pixel color to the user via a head-mounted display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4B illustrates an example of the virtual environment shown in FIG. 4A, in which, due to motion of the user's hand, the illustrated second hand motion input source pose is no longer directed onto the surface.

FIG. 4C illustrates an example of the virtual environment shown in FIG. 4B, in which, due to further motion of the user's hand, the illustrated third hand motion input source pose is directed further away from the surface.

FIG. 5E illustrates an example portion of a rasterized frame in which the first virtual input line intersects the surface as illustrated in FIG. 5A, but a visual feedback indication displayed around the first virtual intersection is selectively rendered for pixels within the boundaries of the surface.

FIG. 7B illustrates an example rasterized frame including, along with the other features rendered in the frame illustrated in FIG. 7A, a beam extending along the third virtual input line.

FIG. 10A illustrates a portion of the virtual environment as rendered from a virtual camera position for display to the user. FIG. 10B illustrates the virtual environment shown in FIG. 10A as viewed from a different perspective.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In overview, systems and methods are disclosed that provide specific visual cues to users operating in a virtual environment. Generally, a three-dimensional virtual environment can include a variety of virtual objects. As will be discussed further below, these virtual objects can be visually rendered to provide ongoing feedback to a user, enhancing the user's experience of the virtual world as well as their ability to make selections and/or identify interactive features of virtual objects. For example, as a direction and/or orientation of a virtual input source is directed by motions of the user's hand to a come into proximity to portions of a virtual object, the pixel colors associated with such portions of the virtual object can respond by producing variations in luminosity that allow the user to interact within the virtual environment more intuitively, reliably, and efficiently. Rendered pixel colors can change in a manner or pattern corresponding to changes in proximity of the virtual input source to one or more portions of a virtual object. Further details and examples regarding these systems and methods are provided below.

Figure 1:
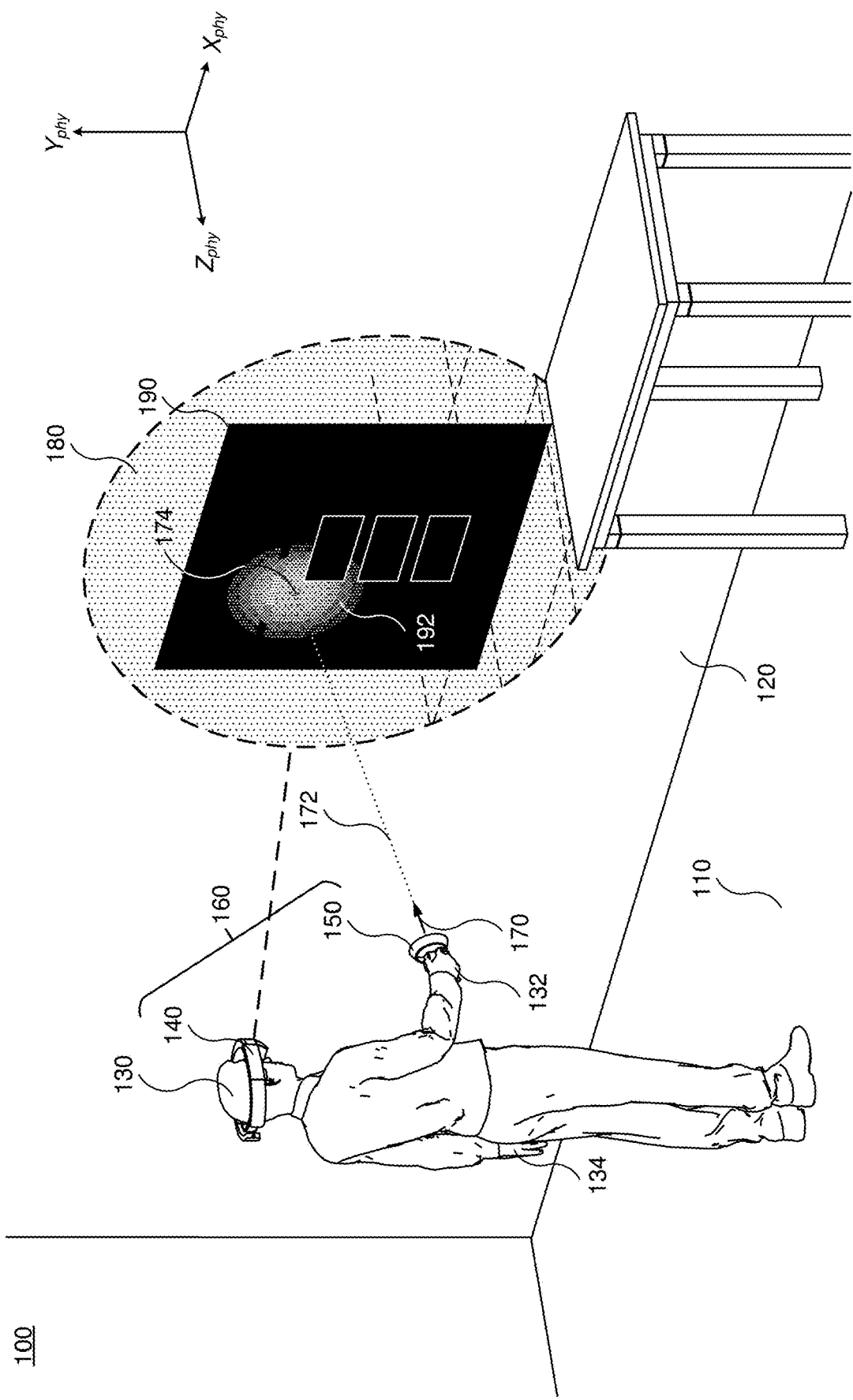
FIG. 1 illustrates an example of a user in a physical environment interacting with a virtual environment via a mixed reality or virtual reality (MR/VR) device.

FIG. 1 illustrates an example of a user 130 in a physical environment 100 interacting with a virtual environment 180 via a mixed reality or virtual reality (MR/VR) device 140. FIG. 1 shows three orthogonal axes, $X_{phy}$, $Y_{phy}$, and $Z_{phy}$, illustrating a coordinate system for the physical environment 100. The physical environment 100 includes a floor 110 arranged substantially parallel to the $X_{phy}$-$Z_{phy}$ plane, and a wall 120 arranged substantially parallel to the $X_{phy}$-$Y_{phy}$ plane. The physical environment also includes a desk 102. The physical environment 100 illustrated in FIG. 1 is merely a simplified example for discussion purposes, and is not intended to be limiting on the type of physical environment or features found therein.

In the example illustrated in FIG. 1, the user 130 is standing on the floor 110 and directly facing the wall 120. Additionally, the user 130 is wearing and actively using the MR/VR device 140. In the example illustrated in FIG. 1, the MR/VR device 140 is a head mounted see-through MR/VR device (such as the Microsoft HoloLens) allowing the user 130 to directly view the physical space 100 in combination with virtual elements displayed by the MR/VR device 140, and includes the elements of the MR/VR device 200 illustrated in FIGS. 2A and 2B. However, it is understood that the illustrated MR/VR device 140 is merely an example implementation, and that any of the various other examples of MR/VR devices described in connection with FIGS. 2A and 2B may also be used to implement the disclosed techniques.

Furthermore, in FIG. 1, the user 130 is holding and manipulating a handheld three-dimensional hand motion tracking apparatus 150 using right hand 132, while the user's left hand 134 is free for other tasks. In this particular example, the hand motion tracking apparatus 150 and the MR/VR device 140 operate together as elements of a three-dimensional hand motion tracking system 160, although the three-dimensional hand motion tracking system 160 is not limited to such embodiments. The three-dimensional hand motion tracking system 160 determines changes in pose, including a three-dimensional position and an orientation, in the physical space 100 for the hand motion tracking apparatus 150 and/or the right hand 132. FIG. 1 includes a direction vector 170 illustrating a direction component of a current pose in the physical environment determined by the three-dimensional hand motion tracking system 160 in connection with the hand motion tracking apparatus 150 for the point in time illustrated in FIG. 1. The direction vector 170 may correspond to the axis of an axis-angle representation of orientation. FIG. 1 also illustrates a virtual line 172 corresponding to the current pose and a virtual intersection point 174, in the physical environment 100, of the virtual line 172 with the wall 120.

FIG. 1 also illustrates a view of a portion of an example virtual environment 180 that the user 130 is interacting with via MR/VR device 140 using changes in pose of the user's right hand 132 determined by the three-dimensional hand motion tracking system 160. The virtual environment 180 includes, among other things, a virtual object 190. It is understood the features of the virtual environment 180 illustrated in FIG. 1, including the virtual object 190, are not physical entities, but are virtual entities displayed, and accordingly visible to, the user 130 via the MR/VR device 140. In this particular illustration, the user 130 perceives the virtual object 190 as being positioned and oriented in the virtual environment 180 at a position and orientation corresponding to the wall 120, although such correspondence between the physical environment 100 and the virtual environment 180 is not required. At the point in time illustrated in FIG. 1, the virtual object 190 is rendered, for display to the user 130 via the MR/VR device 140, to include a visual feedback indication 192 indicating an intersection of a virtual line, associated with right hand 132 and changes in pose of right hand 132, in the virtual environment 180 with a rendered portion of the virtual object 190. As discussed in further detail below, a pose for the virtual line in the virtual environment 180 changes in response to the changes in pose of the user's right hand 132 determined by the three-dimensional hand motion tracking system 160, which consequently changes a proximity of the virtual line in the virtual environment 180 to various portions of the virtual object 190. Thus, the visual feedback indication 192 can be understood to provide a visual indication of proximities of various rendered positions of the virtual object 190 to the virtual line in the virtual environment 180. For example, the visual feedback indication 192 can vary in relation to a proximity of each rendered position to the virtual line in the virtual environment 180.

Figure 2A:
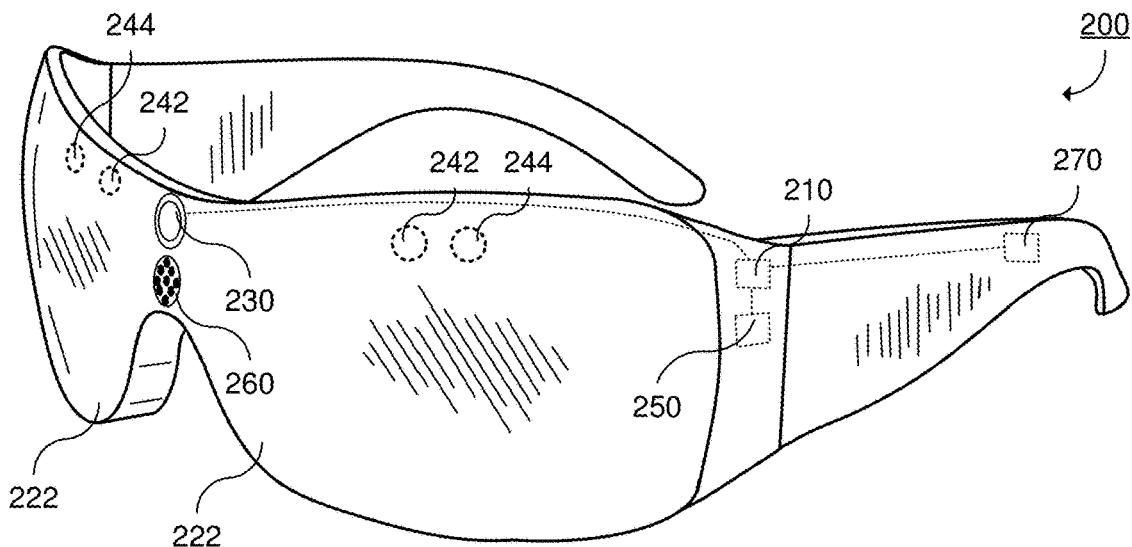
FIG. 2A illustrates an example of an MR/VR device.
Figure 2B:
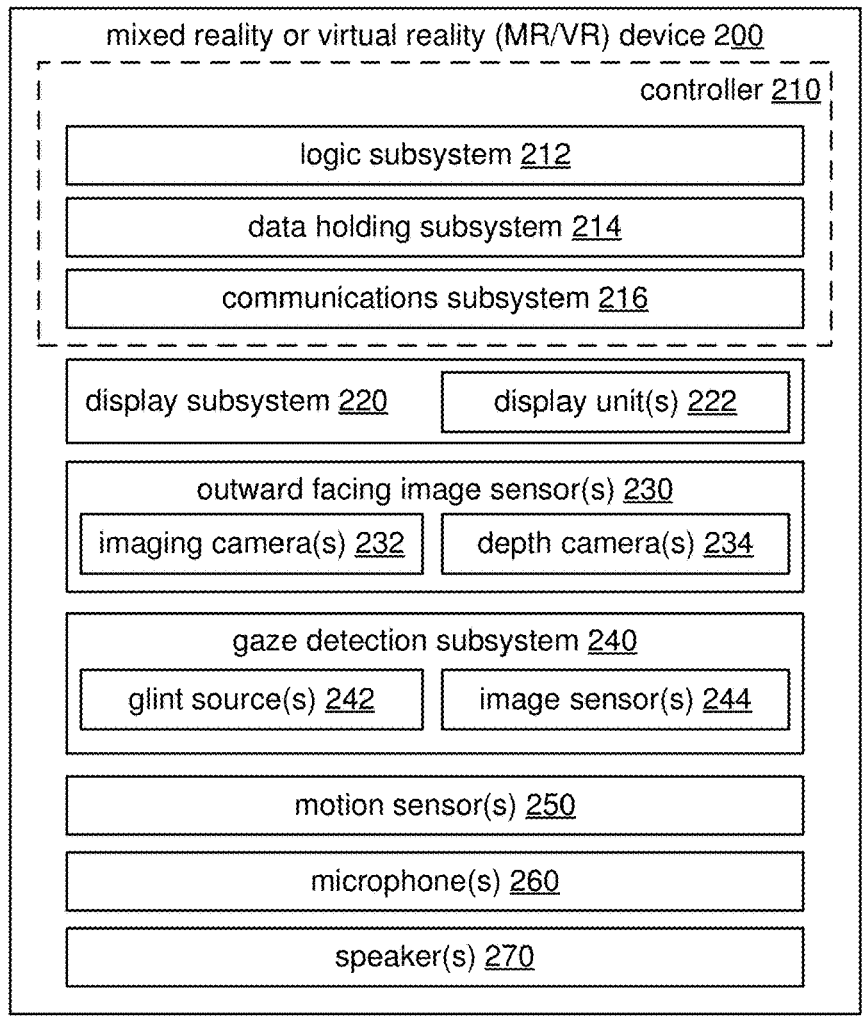
FIG. 2B illustrates a block diagram of the MR/VR device illustrated in FIG. 2A.

FIG. 2A illustrates an example of an MR/VR device 200, and FIG. 2B illustrates a block diagram of the MR/VR device 200 illustrated in FIG. 2A. In the example illustrated in FIGS. 2A and 2B, the MR/VR device 200 is a head mounted MR/VR device, intended to be worn on a user's head during ordinary use, including a head mounted display (HMD) device. However, it is noted that this disclosure is expressly not limited to head mounted MR/VR devices, and techniques described herein may be used with other types of MR/VR devices, including, but not limited to, smartphone devices, tablet computers, notebook computers, and devices or systems including heads up displays that are configured to provide mixed reality capabilities. Mixed reality refers to an experience allowing virtual imagery to be mixed with a real-world physical environment in a display. For example, real-world objects and/or real-world spaces may be identified and augmented with corresponding virtual objects. Mixed reality may be implemented with, for example, virtual reality or augmented reality technologies.

The MR/VR device 200 includes a display subsystem 220 for displaying images to a user of the MR/VR device 200. In the example illustrated in FIG. 2A, the display subsystem 220 is intended to be close to a user's eyes and includes a see-through HMD device. For example, the HMD device can include one or more transparent or semi-transparent see-through lenses 222 arranged such that images may be projected onto the see-through lenses 222, or produced by image-producing elements (for example, see-through OLED displays) located within the see-through lenses 222. A user wearing an example of the MR/VR device 200 with see-through lenses 222 has an actual direct view of a real-world space (instead of image representations of the real-world space) through the see-through lenses 222, and at the same time a view of virtual objects (which may be referred to as virtual images or holograms) that augment the user's direct view of the real-world space. It is noted that this disclosure is expressly not limited to MR/VR devices using see-through display devices. In some implementations, the display subsystem 220 may be non-transparent and block, in all or part of a user's field of view, or otherwise prevent the user from directly viewing a real-world space through the display subsystem 220. Such implementations include, but are not limited to, augmented reality devices arranged to display visual images of a physical environment in front of the MR/VR device 200 with virtual objects added to augment the display of the physical environment, and virtual reality devices arranged to display virtual objects at positions corresponding to those of real-world objects in the physical environment in front of the MR/VR device 200.

The MR/VR device 200 further includes one or more outward facing image sensors 230 configured to acquire image data for a real-world scene around and/or in front of the MR/VR device 200. The outward facing image sensors 230 may include one or more digital imaging camera(s) 232 arranged to capture two-dimensional visual images. In some implementations, two imaging camera(s) 232 may be used to capture stereoscopic images. The outward facing imaging sensors 230 may also include one or more depth camera(s) 234, such as, but not limited to, time of flight depth cameras, arranged to capture depth image data, such as a depth map providing estimated and/or measured distances from the MR/VR device 200 to various portions of a field of view (FOV) of the depth camera(s) 234. Depth image data obtained via the depth camera(s) 234 may be registered to other image data, such as images concurrently captured via imaging camera(s) 232. The outward facing image sensors 230 may be configured to capture individual images and/or sequences of images (for example, at a configurable frame rate or frames rates). In some implementations, the outward facing image sensors 230 or other sensors associated with the MR/VR device 200 can be configured to assess and/or identify external conditions, including but not limited to time of day, direction of lighting, ambiance, temperature, and other conditions. The external conditions can provide the MR/VR device 200 with additional factor(s) to determine types of virtual graphical elements to display to a user.

The MR/VR device 200 may further include a gaze detection subsystem 240 configured to detect, or provide sensor data for detecting, a direction of gaze of one or both eyes of a user, as illustrated in FIGS. 2A and 2B. The gaze detection subsystem 240 may be arranged to determine gaze directions of each of a user's eyes in any suitable manner. For example, in FIGS. 2A and 2B, the gaze detection subsystem 240 includes one or more glint sources 242, such as infrared light sources, arranged to cause a glint of light to reflect from each eyeball of a user, and one or more image sensor(s) 244 arranged to capture an image of each eyeball of the user. Changes in the glints from the user's eyeballs as determined from image data gathered via image sensor(s) 244 may be used to determine a direction of gaze. Further, a location at which gaze lines projected from the user's eyes intersect the external display may be used to determine an object or position at which the user is gazing (for example, a virtual object displayed by the display subsystem 220). The gaze detection subsystem 240 may have any suitable number and arrangement of glint sources and image sensors. For example, in one non-limiting example, four glint sources and one image sensor are used for each eye. Furthermore, in some implementations, the gaze detection subsystem 240 can be configured to assist the MR/VR device 200 in more accurately identifying real-world objects of interest and associating such objects with virtual applications.

The MR/VR device 200 may include audio hardware, including one or more microphones 260 arranged to detect sounds, such as verbal commands from a user of the MR/VR device 200, and/or one or more speaker(s) 270 arranged to output sounds to the user, such as verbal queries, responses, instructions, and/or information.

The MR/VR device 200 may include one or more motion sensor(s) 250 arranged to measure and report motion of the MR/VR device 200 as motion data. In some implementations, the motion sensor(s) 250 may include an inertial measurement unit (IMU) including accelerometers (such as a 3-axis accelerometer), gyroscopes (such as a 3-axis gyroscope), and/or magnetometers (such as a 3-axis magnetometer). The MR/VR device 200 may be arranged to use this motion data to determine changes in position and/or orientation of MR/VR device 200, and/or respective changes in position and/or orientation of objects in a scene relative to MR/VR device 200. The outward facing image sensor(s) 230, image sensor(s) 244, sensors included in the motion sensor(s) 250, and microphone(s) 260, which are included in or are coupled to the head mounted MR/VR device 200, may be, individually or collectively, referred to as head mounted sensors. Data collected via such head mounted sensors reflect the pose of a user's head.

The MR/VR device 200 further includes a controller 210 including a logic subsystem 212, a data holding subsystem 214, and a communications subsystem 216. The logic subsystem 212 may include, for example, one or more processors configured to execute instructions and communicate with the other elements of the MR/VR device 200 illustrated in FIGS. 2A and 2B according to such instructions to realize various aspects of this disclosure involving the MR/VR device 200. Such aspects include, but are not limited to, configuring and controlling devices, processing sensor input, communicating with other computer systems, and/or displaying virtual objects via display subsystem 220. Examples of the processors include, but are not limited to, a central processing unit (CPU), a graphics processing unit (GPU), a digital signal processor (DSP), an ASIC, or suitable combinations thereof. The data holding subsystem 214 includes one or more memory devices (such as, but not limited to, DRAM devices) and/or one or more storage devices (such as, but not limited to, flash memory devices). The data holding subsystem 214 includes one or more machine readable media having instructions stored thereon which are executable by the logic subsystem 212 and which when executed by the logic subsystem 212 cause the logic subsystem 212 to realize various aspects of this disclosure involving the MR/VR device 200. Such instructions may be included as part of an operating system, application programs, or other executable programs. The communications subsystem 216 is arranged to allow the MR/VR device 200 to communicate with other computer systems. Such communication may be performed via, for example, Wi-Fi, cellular data communications, and/or Bluetooth.

It will be appreciated that the MR/VR device 200 is provided by way of example, and thus is not meant to be limiting. Therefore, it is to be understood that the MR/VR device 200 may include additional and/or alternative sensors, cameras, microphones, input devices, output devices, etc. than those shown without departing from the scope of this disclosure. Also, the physical configuration of an MR/VR device and its various sensors and subcomponents may take a variety of different forms without departing from the scope of this disclosure. Further, various functions described herein and features of MR/VR device 200 (including processors included in logic subsystem 212, data holding subsystem 214, and instructions stored therein) can be divided and/or distributed among multiple devices and/or processing systems. For example, the user 130 may wear a simplified head mounted device including a display and head mounted sensors, but with much of the processing performed by an external device such as a handheld, notebook, or desktop computing device. FIGS. 2A and 2B illustrate examples of devices, methods, and/or processes for interacting with virtual environments via features provided by the MR/VR device 200 and software applications executing on an MR/VR device. The devices, methods, and/or processes illustrated in FIGS. 2A and 2B may be implemented using and/or in combination with the various devices, systems, elements, and features described above in connection with FIG. 1.

Figure 2C:
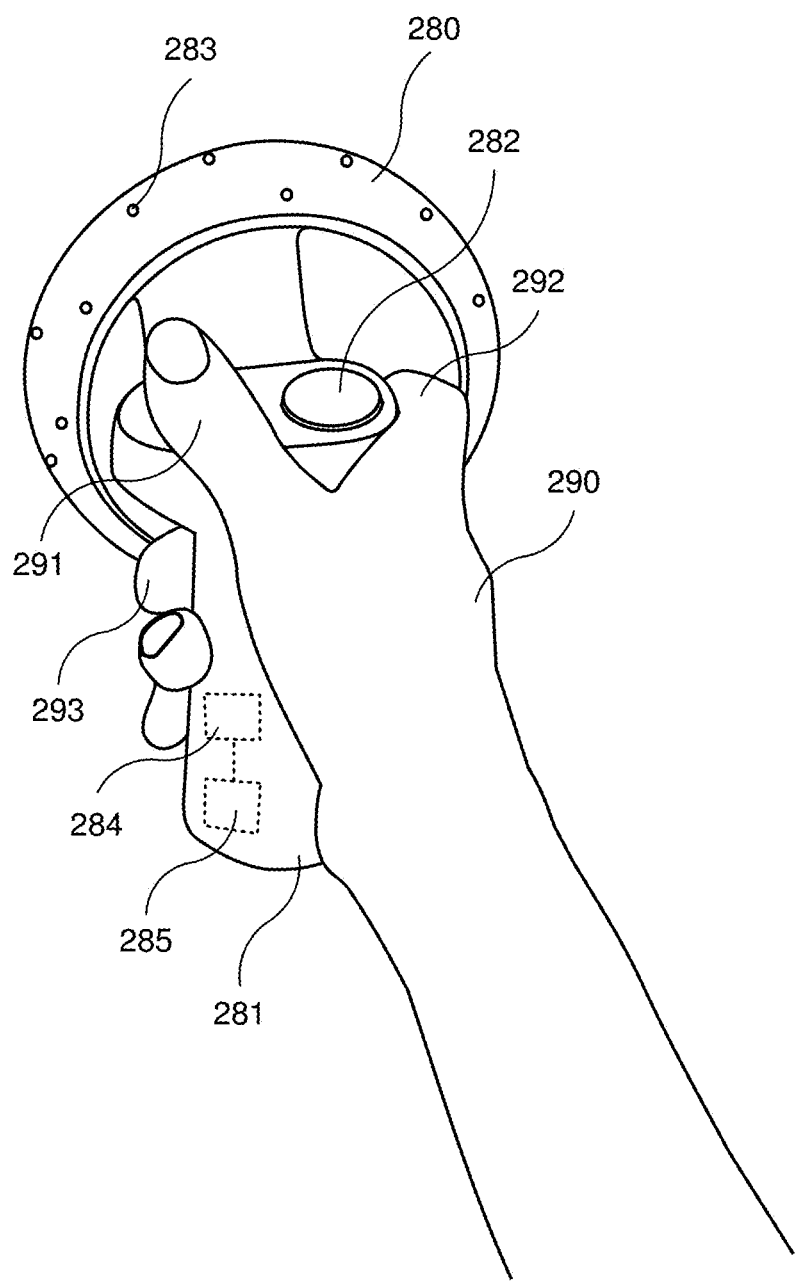
FIG. 2C illustrates an example of a handheld three-dimensional hand motion tracking apparatus adapted for use as part of a three-dimensional hand motion tracking system.

FIG. 2C illustrates an example of a handheld three-dimensional hand motion tracking apparatus 280 adapted for use as part of a three-dimensional hand motion tracking system. For purposes of this discussion, the three-dimensional hand motion tracking apparatus 280 may also be referred to as a "motion controller" or an "input device." The specific example of the motion controller 280 illustrated in FIG. 2A is the Microsoft Mixed Reality Motion Controller commercially released in 2017. The motion controller 280 is adapted to interact with an MR/VR device, such as the MR/VR device 200 in FIGS. 2A and 2B, and to determine poses of the motion controller 280 and/or a user's hand 290, or a portion of hand 290, holding and manipulating the motion controller 280. FIG. 2C illustrates examples of devices, methods, and/or processes for interacting with virtual environments via hand motion tracking. The devices, methods, and/or processes illustrated in FIG. 2C may be implemented using and/or in combination with the various devices, systems, elements, and features described above in connection with FIGS. 1-2B.

The motion controller 280 includes a controller 284 including a logic subsystem, a data holding subsystem, and a communications subsystem. The logic subsystem may include, for example, one or more processors configured to execute instructions and communicate with other elements of the motion controller 280 according to such instructions. Such aspects include, but are not limited to, processing sensor input and communicating with other computer systems. The data holding subsystem includes one or more memory devices and/or one or more storage devices, and includes one or more media having instructions stored thereon which are executable by the logic subsystem, which cause the logic subsystem to realize various aspects of this disclosure involving the motion controller 280. Such instructions may be included as part of an operating system, firmware, or other executable programs. The communications subsystem is arranged to allow the motion controller 280 to communicate with other computer systems. Such communication may be performed via, for example, Wi-Fi and/or Bluetooth.

The motion controller 280 also includes one or more motion sensor(s) 285 arranged to measure and report motion of the motion controller 280 as motion sensor data. In some implementations, the motion sensor(s) 285 may include an inertial measurement unit (IMU) including accelerometers (such as a 3-axis accelerometer), gyroscopes (such as a 3-axis gyroscope), and/or magnetometers (such as a 3-axis magnetometer). The instructions executed by the logic subsystem cause the logic subsystem to receive the motion sensor data and transmit corresponding motion data via the communications subsystem to one or more other computer systems.

In some implementations, the motion controller 280 includes one or more input sensors arranged to detect motions of the digits of hand 290. For example, FIG. 2C illustrates a capacitive touchpad 282 arranged to detect a position or area of contact of the thumb 291 of hand 290. Other examples of input sensors include, but are not limited to, a thumbstick and buttons at various positions on motion controller 280, such as one or more buttons arranged for operation by thumb 291, a trigger operated by index finger 292 of the hand 290, and one or more buttons on handle 281 of the motion controller 280 operated by fingers positioned on or near handle 281, such as middle finger 293. The instructions executed by the logic subsystem cause the logic subsystem to obtain information from the input sensors and transmit corresponding input data via the communications subsystem to one or more other computer systems.

In some implementations, the motion controller 280 operates in combination with MR/VR device 200 to provide a three-dimensional hand motion tracking system. A plurality of optical tracking elements, such as optical tracking element 283, are arranged on an exterior of the motion controller 280. The MR/VR device 200 is configured to capture, via digital imaging camera(s) 232, images of the motion controller 280, including the optical elements visible to the digital imaging camera(s) 232. Additionally, the MR/VR device 200 is configured to communicate with the motion controller 280 to receive motion data from the motion controller 280. In combination with other data processed by the MR/VR device 200 relating to changes in pose of the MR/VR device 200, the MR/VR device is configured to determine pose estimates for the motion controller 280 and/or hand 290, based at least on positions of the optical elements in the captured images and the motion data received from the motion controller 280. The estimated poses may be for current poses of the motion controller 280 and/or predicted future poses of the motion controller 280 (based on recent motion of the motion controller 280). The estimated poses may be used by the MR/VR device 200 for affecting user actions in a virtual environment, as will be discussed further below.

It will be appreciated that the motion controller 280, and the described operation in combination with MR/VR device 200 to provide a three-dimensional hand motion tracking system, is provided by way of example, and thus is not meant to be limiting. Therefore, it is to be understood that the motion controller 280 may include additional and/or alternative sensors, input devices, output devices, etc. than those shown without departing from the scope of this disclosure. Further, the physical configuration of a motion controller and its various sensors and subcomponents may take a variety of different forms without departing from the scope of this disclosure.

Figure 3:
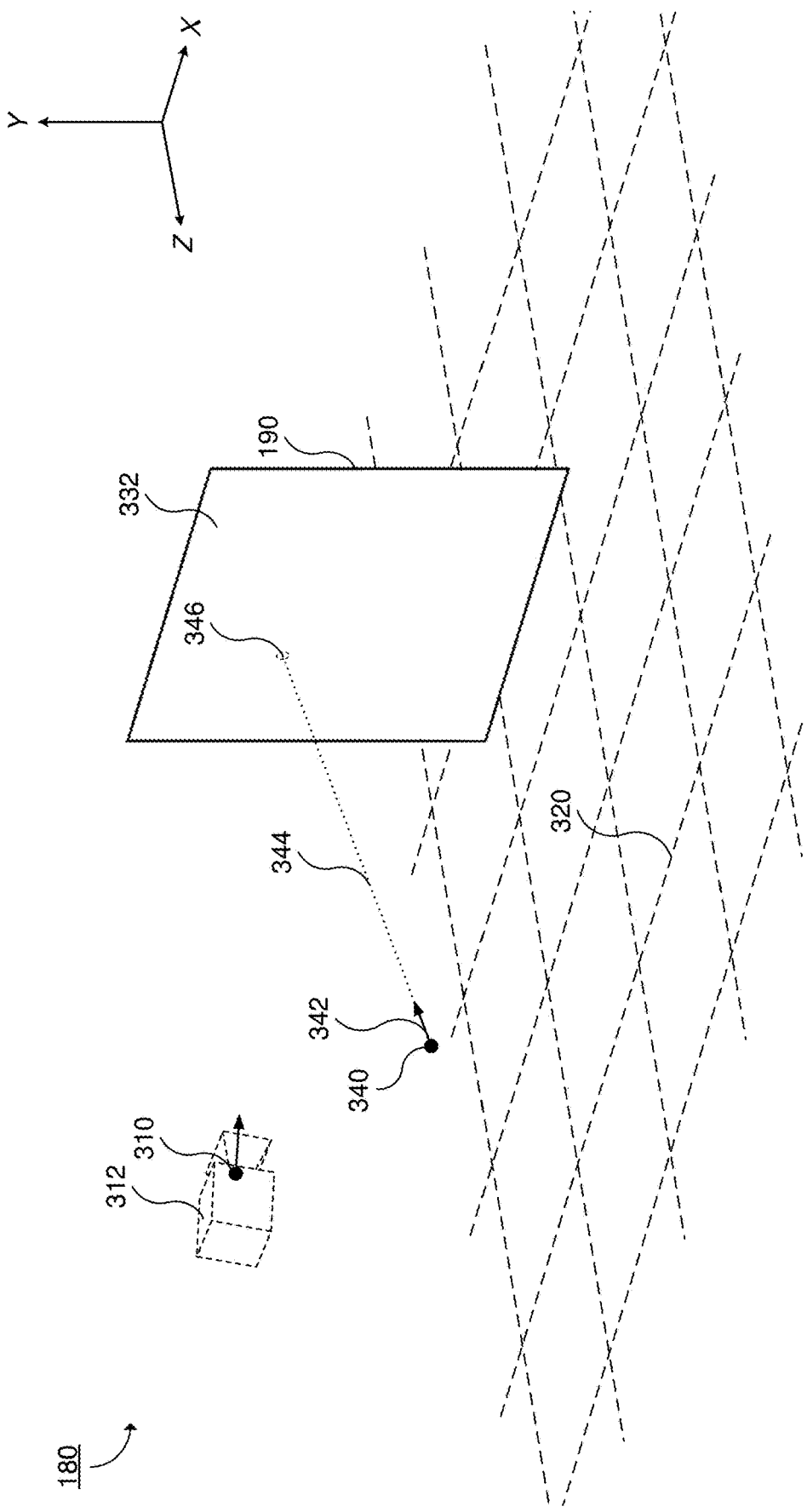
FIG. 3 illustrates a simplified example of a three-dimensional virtual environment the user in FIG. 1 is interacting with via the MR/VR device worn by the user.

FIG. 3 illustrates a simplified example of a three-dimensional virtual environment 180 the user 130 in FIG. 1 is interacting with via the MR/VR device 140 worn by the user 130. Various examples of device, methods, and/or processes for interacting with a virtual environment via an MR/VR device are described in connection with FIG. 3. These devices, methods, and/or processes may be implemented using and/or in combination with the various devices, systems, elements, and features described above in connection with FIGS. 1-2C. FIG. 3 illustrates a perspective view of the virtual environment 180, rather than a user view. The virtual environment 180 may also be referred to as a "scene" or "world." For purposes of clarity, FIG. 3 shows three orthogonal axes, X, Y, and Z, illustrating a coordinate system for the virtual environment 180. It should be understood that the orientation of the axes X, Y, and Z in the virtual environment 180 does not necessarily correspond to the axes $X_{phy}$, $Y_{phy}$, and $Z_{phy}$ in the physical environment 100 shown FIG. 1.

FIG. 3 illustrates a camera pose 310 and a virtual camera 312 positioned and oriented in the virtual environment 180 according to the camera pose 310. The camera pose 310 and virtual camera 312 define a viewpoint for rendering elements of the virtual environment 180 for display to the user 130 via MR/VR device 140. Although various illustrations may show the camera pose 310 in the same pose illustrated in FIG. 3, this is merely a simplification for purposes of discussion. The camera pose 310 in the virtual environment 180 changes over time in correspondence with pose changes determined for the MR/VR device 140 in the physical environment 100. In some examples, an angular change in orientation of MR/VR device 140 will result in an equal amount of angular change in the orientation of the camera pose 310. The camera pose 310 may also be determined based in part on identification of features of the physical environment 100 around the MR/VR device 140. For example, by use of a depth camera or other sensors, a position and/or orientation determined for the floor 110 may be used to determine a Y coordinate component of camera pose 310. The camera pose 310 may also change in response to events other than motion of the MR/VR device 140, such as, but not limited to, a "teleport" action to a new position selected by the user 130 or simulated travel through the virtual environment 180. Although a single virtual camera 312 is illustrated in FIG. 3, for an MR/VR device having a stereoscopic display, a second virtual camera (not illustrated in FIG. 3) may be included positioned adjacent to the first virtual camera 312, providing a virtual camera for each of the user's two eyes. In some implementations, the user 130 may move to a different virtual environment. For example, the user 130 may instruct the MR/VR device 140 to switch from a virtual office environment to a virtual conference room. In some examples, a virtual floor 320 may be rendered for display via MR/VR device 140.

The virtual environment 180 includes one or more virtual objects at respective positions in the virtual environment 180, including the illustrated virtual object 190. For purposes of this disclosure, the virtual objects may also be referred to as "holograms," or more simply as "objects." The virtual objects, or portions thereof, depending on the camera pose 310, may be displayed to the user 130 via the MR/VR device 140. Some of the virtual objects may be positioned and/or oriented in the virtual environment 180 based on identification of features of the physical environment 100 around the MR/VR device 140. For example, the virtual object 190 may be positioned and/or oriented based on a position and/or orientation determined for the wall 120 in the physical space 100. Such correspondence between features of the physical environment 100 and virtual object positioning is useful where the MR/VR device 140 has a see-through display or is an augmented reality device, as static virtual objects appear to have fixed positions in the physical space 100 and may conform to features of the physical environment 100. It is also useful for a virtual reality device, as virtual object counterparts to features of the physical environment 100 may allow the user to interact with features of the physical environment 100 despite being unable to directly view the physical environment 100. For example, it may facilitate user 130 interacting with the top surface of the table 102 or real-world objects placed thereon.

Each virtual object is instantiated by a corresponding computer program (including, for example, an application program, a system program, and/or an operating system), and may provide a user interface for interacting with the instantiating program. It is noted that although other figures illustrate the virtual object 190 at the same position and orientation shown in FIG. 3, this is merely a simplified example for discussion purposes. The position, orientation, size, shape, and appearance of a virtual object may change over time. Additionally, virtual objects can be added or removed from the virtual environment 180. In some examples, a virtual object, or portions thereof, can be designated as not visible, and accordingly not rendered for display via MR/VR device 140.

A virtual object may include one or more surfaces, at respective positions and/or orientations. In FIG. 3, the virtual object 190 includes a rectangular surface 332 with edges parallel to the X and Y axes. Although a planar surface 332 is illustrated in FIG. 3, a surface does not have to be planar. For example, a surface may be curved. Additionally, a single surface may have multiple planar faces with different normal unit vectors. Also, a surface of a virtual object may have a more complex shape. A surface of a virtual object, a portion of the surface, or the virtual object as a whole may provide, an affordance allowing interaction with the computer program instantiating the virtual object (which may result in, among other things, changes in the appearance of the virtual object). A surface providing an affordance may be referred to as an "interactive" surface. A virtual object providing an affordance may be referred to as an "interactive" virtual object. Examples of such affordances include, but are not limited to, buttons, checkboxes, radio buttons, toggles, text fields, pickers (allowing selection of, for example, a list item or a date), tabs, sliders, dials, and carousels. A single surface may include multiple visual elements, including those associated with affordances. For example, a surface may provide a user interface that displays images and/or text and includes affordances for interaction with the user interface. Affordances may be dynamically added, removed, enabled, or disabled. Also, the number, content, and appearance of visual elements included in a surface may change over time. Various techniques described herein relate to visual feedback that allows users to more effectively and confidently discover, identify, navigate to, and interact with objects or surfaces including affordances and the affordances themselves via hand-driven interaction.

FIG. 3 also illustrates a hand motion input source pose 340, which changes position and orientation in response to pose changes determined by the three-dimensional hand motion tracking system 160 for hand motions performed by the user 130. In this description, a hand motion input source pose may also be referred to as an "input source pose" or an "input source." In this example, the input source pose 340 is responsive to motions of the hand motion tracking apparatus 150 as it is manipulated with right hand 132. In some examples, an angular change in orientation for a pose determined by the three-dimensional hand motion tracking system 160 in the physical environment 100 will result in an equal amount of angular change in the orientation of the hand motion input source pose 340. The position of the hand motion input source pose 340 may correspond to a position of a real-world object being tracked by the three-dimensional hand motion tracking system 160, such as the hand motion tracking apparatus 150. Although only one hand motion input source pose 340 is associated with the user 130 in the example illustrated in FIG. 3, in some examples, there may be multiple concurrent hand motion input source poses associated with a single user. For example, instead of holding the single hand motion tracking apparatus 150, the user 130 may hold two hand motion tracking apparatuses— the first hand motion tracking apparatus 150 in the user's right hand 132, and a second similar hand motion tracking apparatus in the user's left hand 134. As another example, with a three-dimensional hand motion tracking system adapted to determine poses for one or more digits on a hand, multiple hand motion input source poses may be associated with a user, with hand motion input source poses changing along with movements of individual fingers. Hand motion input source poses may be dynamically added, removed, enabled, and/or disabled. For example, the user 130 may begin using a second hand motion tracking apparatus with left hand 134, at which point a second corresponding hand motion input source pose would be added.

Interactions with affordances in the virtual environment 180 may be performed via the hand motion input source pose 340, allowing the user's right hand 132 to serve as a virtual end effector within virtual environment 180. FIG. 3 illustrates a direction vector 342 representing a direction component of the hand motion input source pose 340, and a virtual input line 344 (which may also be referred to as a "virtual line," a "virtual input source line," an "input source projection," or an "input source pose projection") extending from the position of the hand motion input source pose 340 along the direction vector 342. The virtual input line 344 intersects the surface 332 of virtual object 190 at the illustrated virtual intersection 346. In this example, neither the virtual input line 344 nor the virtual intersection 346 are rendered for display via MR/VR device 140, although in some examples one or both of them may be rendered. The virtual intersection 346 defines a point of interaction between the hand motion input source pose 340 and the intersecting surface or virtual object (in this example, the surface 332 of virtual object 190). When the virtual intersection 346 is positioned on an affordance, the user 130 may interact with the virtual environment 180 via that affordance. It is noted that the illustrated straight virtual input line 344 extending from the hand motion input source pose 340 is not the only method to identify a point of interaction in the virtual environment 180.

Figure 4A:
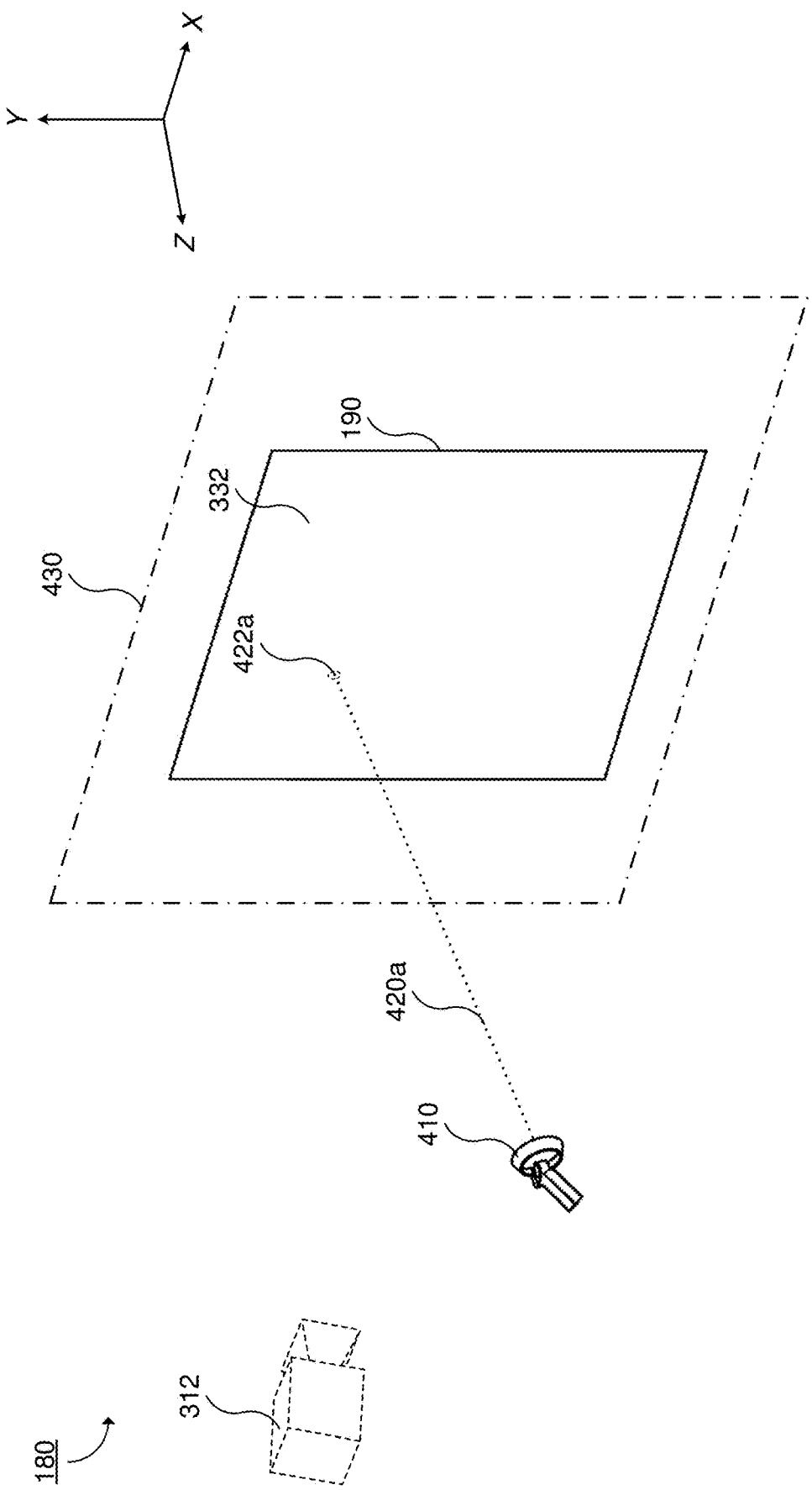
FIG. 4A illustrates another example of the user in FIG. 1 interacting with the virtual environment illustrated in FIG. 3.

FIG. 4A illustrates another example of the user 130 in FIG. 1 interacting with the virtual environment 180 illustrated in FIG. 3. FIG. 4A illustrates a different perspective view than used in FIG. 3. The virtual environment 180 includes the virtual object 190 and surface 332 described in connection with FIG. 3. In FIG. 4A, the virtual environment 180 includes another virtual object—a synthetic model, or avatar 410, of the hand motion tracking apparatus 150. A position and orientation of the avatar 410 in the virtual environment 180 corresponds to a first hand motion input source pose associated with the hand motion tracking apparatus 150. In FIG. 4A, the position of the first hand motion input source pose is indicated by the avatar 410 (for example, at a center of the ring-shaped portion of the avatar 410), and the orientation of the first hand motion input source pose is illustrated by a first virtual input line 420a, much as in FIG. 3, and an orientation of the avatar 410 (which may visually indicate an angle of rotation around the first virtual input line 420a, depending on the model used for the avatar 410). The avatar 410 may be a visible virtual object that is rendered for display via MR/VR device 140 when the avatar 410 is within the field of view of virtual camera 312, allowing the user 130 to observe the hand motion tracking apparatus 150 within the virtual environment 180. In some implementations, a synthetic model representing the user's hand 132 may be included in the virtual environment 180 and displayed via the MR/VR device 140, including in combination with the avatar 410, to allow the user to observe detected hand movements or actions.

FIG. 4A also illustrates a portion of a virtual surface 430 that is associated with the surface 332 or the virtual object 190, which extends beyond its associated surface or virtual object, and which is used for determining a degree of proximity of the first virtual input line 420a to one or more portions of the associated surface or virtual object. In this specific example, the virtual surface 430 is defined by a plane (a portion of which is shown in FIG. 4A) containing or approximately coplanar (including, for example, a plane substantially parallel to surface 332 and intersecting or in close proximity to surface 332) to surface 332. The example of a planar virtual surface 430 in FIG. 4A is not intended to limit virtual surface 430 to planes. FIG. 4A illustrates a first virtual intersection 422a of the first virtual input line 420a with the virtual surface 430. In this particular example, since the first hand motion input source pose is directed toward the surface 432 (as illustrated by the first virtual input line 420a) and the surface 432 is coplanar with the virtual surface 430, the first virtual intersection 422a also indicates a point of intersection with the surface 432.

FIG. 4B illustrates an example of the virtual environment 180 shown in FIG. 4A, in which, due to motion of the user's hand 132, the illustrated second hand motion input source pose is no longer directed onto the surface 432. However, the second hand motion input source pose shown in FIG. 4B is directed in close proximity to the surface 432. Translation and rotation of the hand motion tracking apparatus 150 (in this example, the user 130 has moved the hand motion tracking apparatus 150 to the left and rotated downward from its pose for FIG. 4A), as determined by the three-dimensional hand motion tracking system 160, have resulted in the change from the first hand motion input source pose shown in FIG. 4A to the second hand motion input source pose shown in FIG. 4B. Much as in FIG. 4A, the position of the second hand motion input source pose is indicated by the avatar 410, and the orientation of the second hand motion input source pose is illustrated by a second virtual input line 420b and an orientation of the avatar 410. FIG. 4B illustrates a second virtual intersection 422b of the second virtual input line 420b with the virtual surface 430. In contrast to the example illustrated in FIG. 4A, the second virtual input line 420b does not intersect the surface 332, as illustrated by the position of the second virtual intersection 422b. However, the second virtual intersection 422b is in close proximity to the surface 332.

FIG. 4C illustrates an example of the virtual environment 180 shown in FIG. 4B, in which, due to further motion of the user's hand 132, the illustrated third hand motion input source pose is directed further away from the surface 432. Unlike the second hand motion input source pose shown in FIG. 4B, the third hand motion input source pose shown in FIG. 4C is no longer directed in close proximity to the surface 432. Translation and rotation of the hand motion tracking apparatus 150 (in this example, the user 130 has moved the hand motion tracking apparatus 150 to the left and rotated downward from its pose for FIG. 4B), as determined by the three-dimensional hand motion tracking system 160, have resulted in the change from the second hand motion input source pose shown in FIG. 4B to the third hand motion input source pose shown in FIG. 4C. Much as in FIGS. 4A and 4B, the position of the third hand motion input source pose is indicated by the avatar 410, and the orientation of the third hand motion input source pose is illustrated by a third virtual input line 420c and an orientation of the avatar 410. FIG. 4C illustrates a third virtual intersection 422c of the third virtual input line 420c with the virtual surface 430. As in the example illustrated in FIG. 4B, the third virtual input line 420c does not intersect the surface 332, as illustrated by the position of the third virtual intersection 422c. However, unlike the second virtual intersection 422b, the third virtual intersection 422c is not adjacent to the surface 332.

Figure 4D:
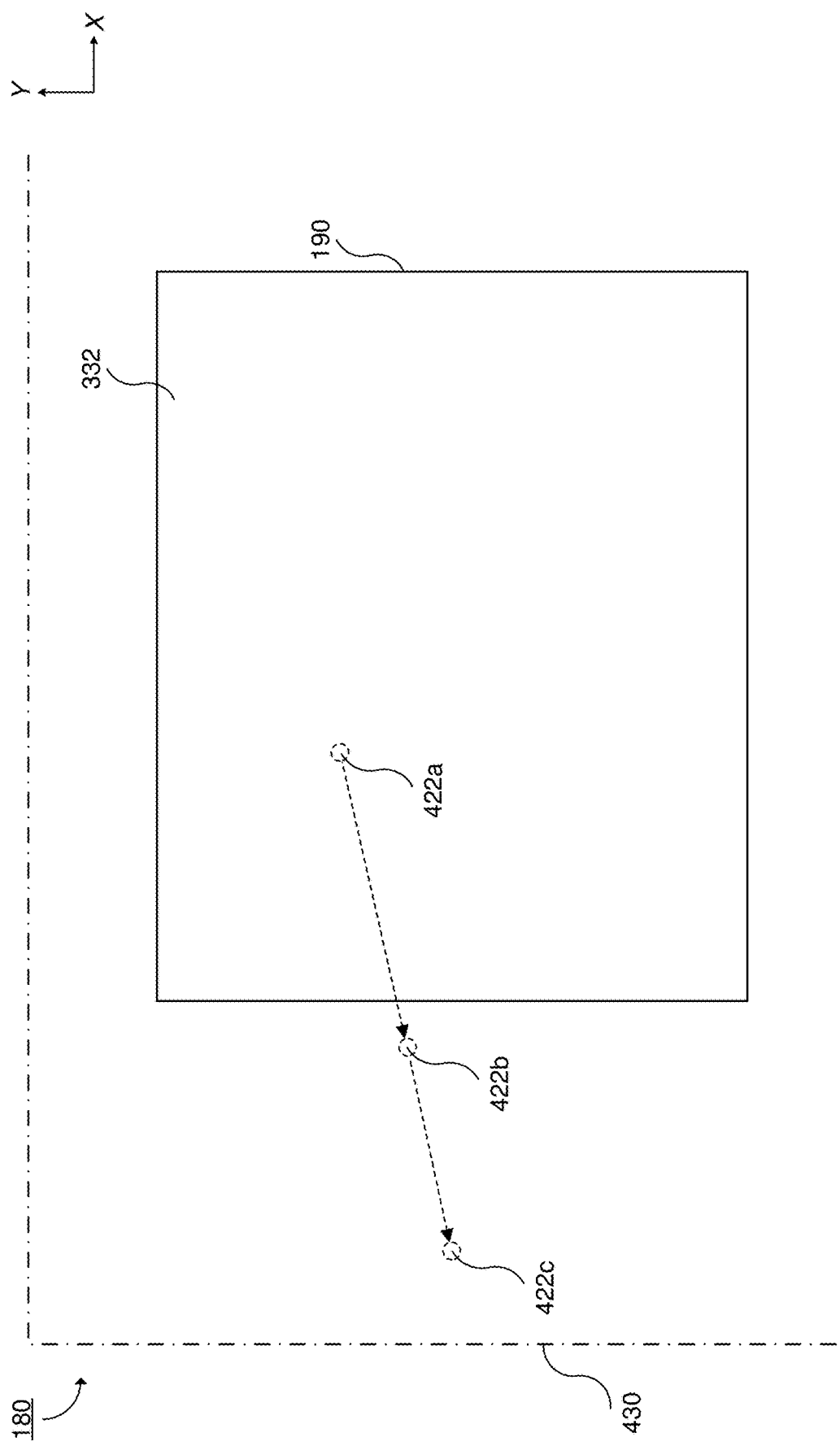
FIG. 4D illustrates the virtual intersections shown in FIGS. 4A, 4B, and 4C, as viewed along the Z axis shown in FIGS. 4A-4C.

FIG. 4D illustrates the virtual intersections 422a, 422b, and 422c shown in FIGS. 4A, 4B, and 4C, as viewed along the Z axis shown in FIGS. 4A-4C. The perspective illustrated in FIG. 4D is similar to the viewpoint of the virtual camera 312 used to render the virtual environment 180 for display via the MR/VR device 140. Various examples of devices, methods, and/or processes for interacting with virtual environments via hand tracking and/or an MR/VR device are described in connection with FIGS. 4A-4D. These device, methods, and/or processes may be implemented using and/or in combination with the various devices, systems, elements, and features described above in connection with FIGS. 1-3.

Figure 5A:
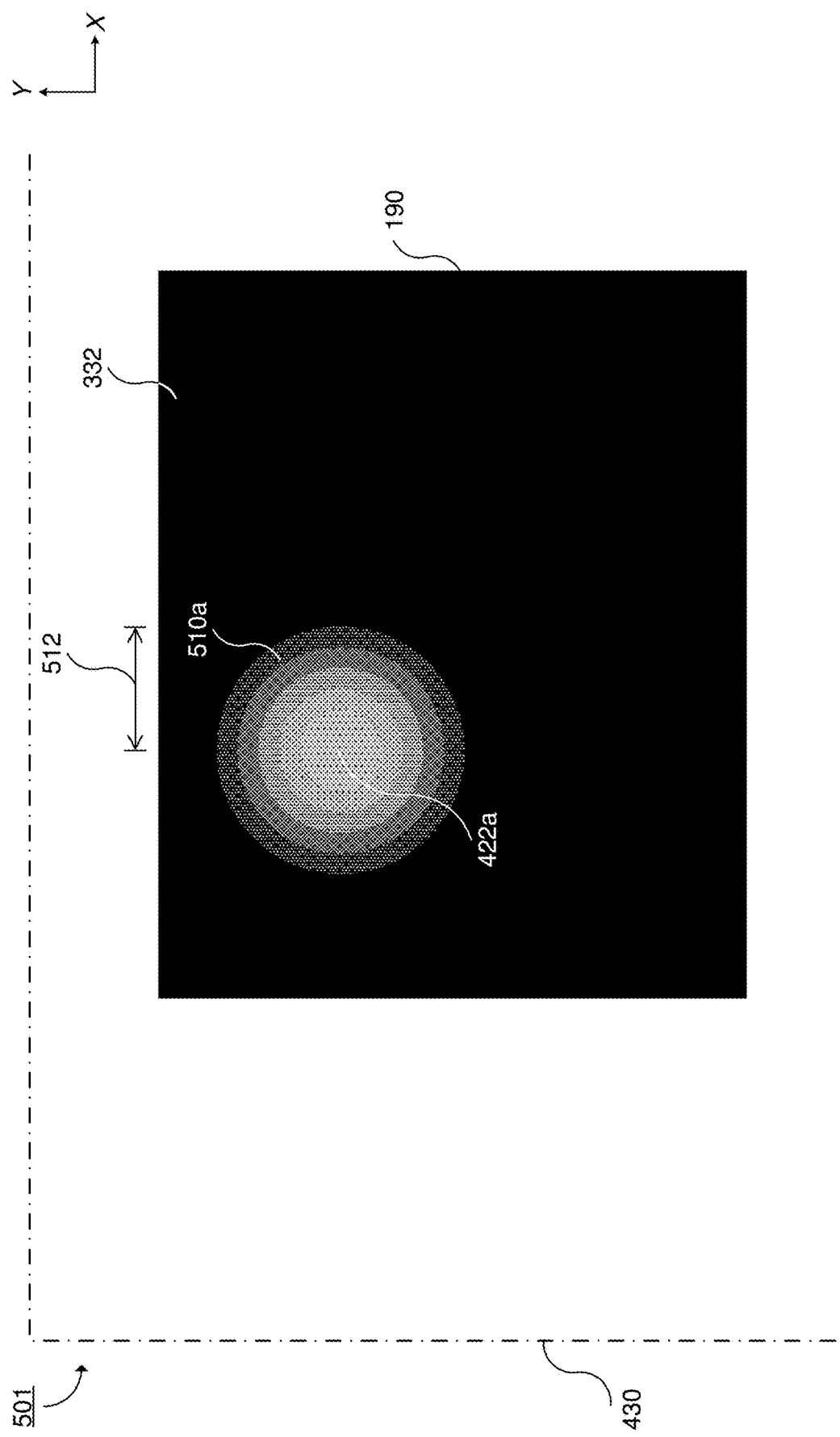
FIG. 5A illustrates an example portion of a rasterized frame including a visual feedback indication that has been rendered to indicate a degree of proximity of the first virtual input line to rendered portions of the surface shown in FIGS. 4A and 4D.

FIG. 5A illustrates an example portion of a rasterized frame 501 including a visual feedback indication 510*a* that has been rendered to indicate a degree of proximity of the first virtual input line 420*a* to rendered portions of the surface 332 shown in FIGS. 4A and 4D. The conditions for generating the frame 501, including use of a corresponding hand motion input source pose, are as illustrated and described for FIG. 4A. The rasterized frame 501 does not include the features illustrated with broken lines, and is displayed via the MR/VR device 140. In this example, the visual feedback indication 510*a* is circular, with a radius 512 and a center at the first virtual intersection 422*a* where the first virtual input line 420*a* intersects the virtual surface 430. The pixel color values for each pixel displaying the visual feedback indication 510*a* (in this specific example, pixels rasterized for positions on the surface 332 within the radius 512 around the first virtual intersection 422*a*) are changed according to a gradated or continuous function of a proximity of a position of the pixel on the surface 332 to the first virtual input line 420*a* defined by the hand motion input source pose used for rendering the frame (in this specific example, the proximity of the position is its distance from the first virtual input line 420*a* as measured from, for example, the first virtual intersection 422*a*). A detailed description of various techniques for rendering the visual indication 510*a* is provided below in connection with FIGS. 5B and 5C.

Figure 5B:
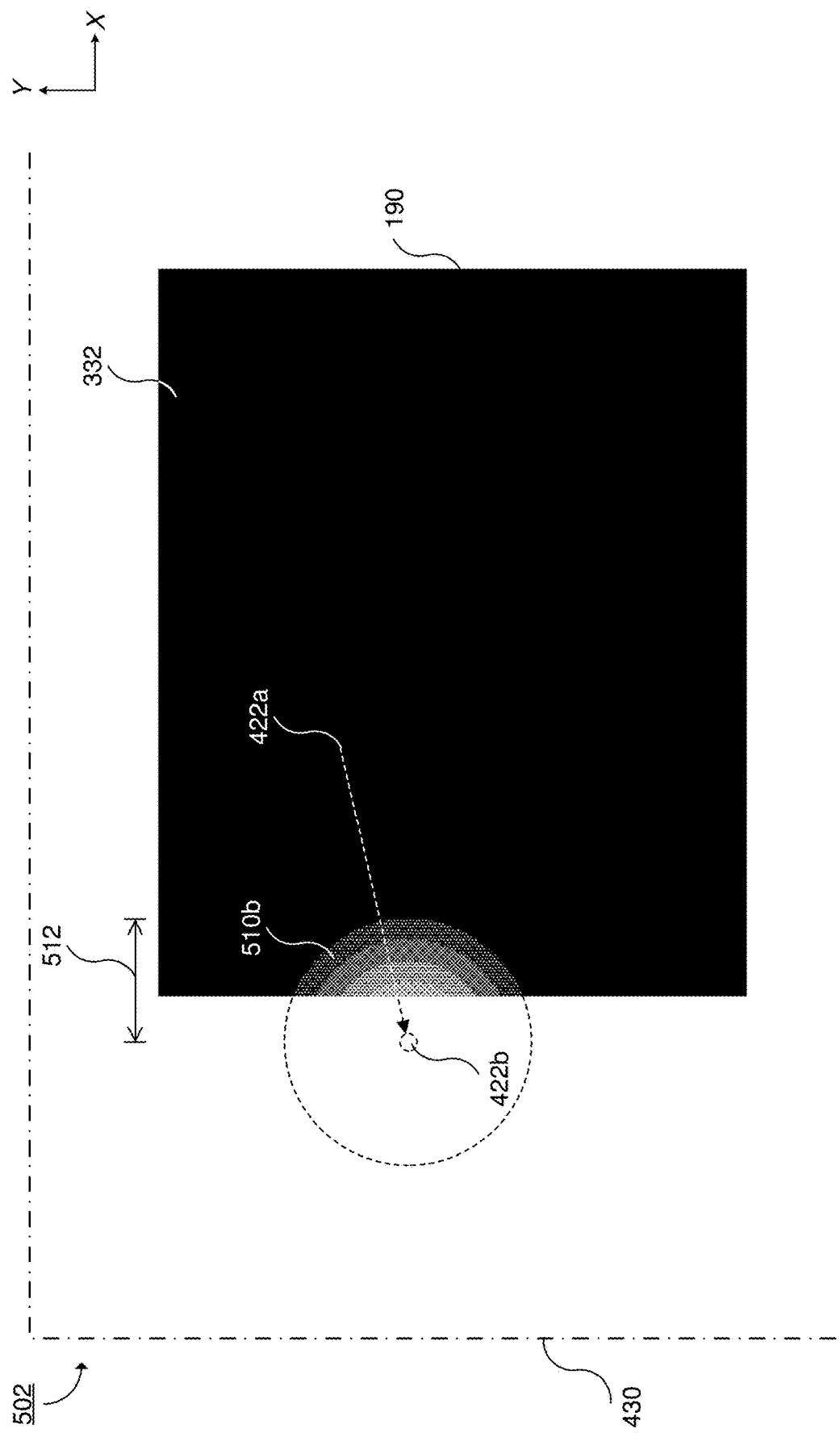
FIG. 5B illustrates an example portion of a rasterized frame including a visual feedback indication that has been rendered to indicate a degree of proximity of the second virtual input line to rendered portions of the surface shown in FIGS. 4B and 4D.

FIG. 5B illustrates an example portion of a rasterized frame 502 including a visual feedback indication 510*b* that has been rendered to indicate a degree of proximity of the second virtual input line 420*b* to rendered portions of the surface 332 shown in FIGS. 4B and 4D. The conditions for generating the frame 502, including use of a corresponding hand motion input source pose, are as illustrated and described for FIG. 4B. The rasterized frame 502 does not include the features illustrated with broken lines, and is displayed via the MR/VR device 140. In contrast to the visual feedback indication 510*a* illustrated in FIG. 5A, the rasterized pixels displaying the visual feedback indication 510*b* for the surface 332 are within a circular segment having a chord or secant along the left edge of the surface 332, with the radius 512, and a center at the second virtual intersection 422*b* where the second virtual input line 420*b* intersects the virtual surface 430. However, the visual feedback indication 510*b* is rendered for the surface 332 despite the second virtual input line 420*b* not intersecting the surface 332. Such feedback is not provided with conventional raycasting or cursor-based interfaces. This allows a user to more confidently determine when and where a virtual input line extending from a current hand motion input source pose is proximate to the surface 332. As with the visual feedback indication 510*a* in FIG. 5A, the pixel color values for each pixel for surface 332 displaying the visual feedback indication 510*b* are changed according to a gradated or continuous function of a proximity of a position of the pixel on the surface 332 to the second virtual input line 420*a* defined by the hand motion input source pose used for rendering the frame.

Figure 5C:
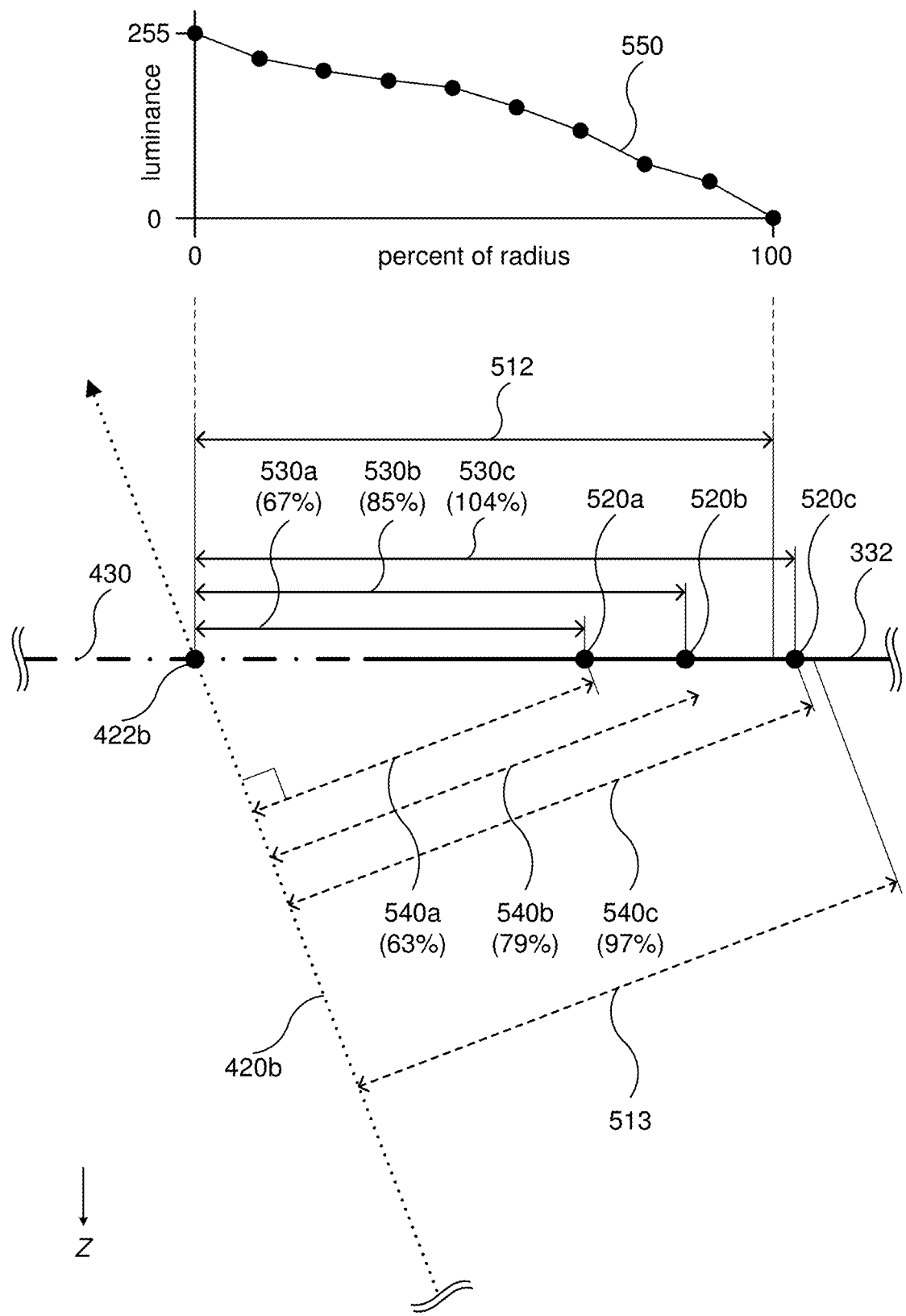
FIG. 5C illustrates example techniques for including the visual feedback indication in the rasterized frame illustrated in FIG. 5B.

FIG. 5C illustrates example techniques for including the visual feedback indication 510*b* in the rasterized frame illustrated in FIG. 5B. The same or similar techniques may also be applied for including the visual feedback indication 510*a* in the rasterized frame illustrated in FIG. 5A, as well as to implement other such visual feedback indications discussed in connection with later figures. FIG. 5C illustrates a portion of the surface 332 and the virtual surface 430 associated with the surface 332. As illustrated in FIGS. 4B and 5B, the second virtual input line 420*b* intersects the virtual surface 430 at the second virtual intersection 422*b*, but does not intersect the surface 332. FIG. 5C illustrates a first position 520*a* corresponding to a first pixel rasterized for the surface 332 and at a first distance 530*a* (67% of the radius 512) from the virtual intersection 422*b*, and a second position 520*b* corresponding to a second pixel rasterized for the surface 332 and at a second distance 530*b* (85% of the radius 512) from the second virtual intersection 422*b*. FIG. 5C also illustrates a third position 520*c* corresponding to a third pixel rasterized for the surface 332 and at a third distance 530*c* (104% of the radius 512) from the virtual intersection 422*b*. As the third distance 530*c* is greater than the radius 512, the third pixel does not display the visual feedback indication 510*b*.

In the specific example illustrated in FIG. 5B, a pixel color value for a rasterized pixel displaying the visual feedback indication 510*b* is determined based in part on an initial color value for the pixel, which corresponds to a color value that would be rendered without the visual feedback indication 510*b*. Although in the example illustrated in FIG. 5B the initial color value is black for the entire surface 332, this is merely to more clearly illustrate the visual feedback indication 510*b* in view of limitations of monochrome images generally required for patent illustrations. The surface 332, without application of the visual feedback indication 510*b*, may have any desired appearance. Also, in some examples, the surface 332 may include portions that are transparent or translucent.

A feedback indication color value for a rasterized pixel displaying the visual feedback indication 510*b* may be determined according to a gradated or continuous function of a proximity of a position for the pixel to the second virtual input line 420*b*. In the examples illustrated in FIGS. 5A and 5B, the luminance of the feedback indication color value changes gradually, with the luminance generally decreasing as the proximity decreases. The rasterized pixel color value is determined by changing the initial color value based on the determined feedback indication color value, such as by weighted or unweighted additive blending of the initial color value and the determined feedback indication color value. Other approaches may be used to determine the rendered color value that more directly modify the initial color value, without a separate determination of a feedback indication color value.

In some implementations, gradual changes in the feedback indication color may be effected by blending color values based on distance. For example, interpolation or weighted combination of the color values and distances in Table 1 may be used to determine a feedback indication color for a given distance. A graph 550 corresponding to the values in Table 1 below is shown at the top of FIG. 5C.

TABLE 1 example stops for feedback indication color blending

| distance from first virtual intersection 422a/radius 512 | RGB color value | HSL color value |
|---|---|---|
| 0% | 255, 255, 255 | 0, 0, 255 |
| 11% | 225, 225, 215 | 43, 36, 220 |
| 22% | 190, 215, 205 | 110, 61, 203 |
| 33% | 175, 190, 205 | 149, 59, 190 |
| 44% | 165, 155, 205 | 179, 85, 180 |
| 55% | 150, 130, 175 | 189, 56, 153 |
| 66% | 110, 105, 135 | 177, 32, 120 |
| 77% | 75, 75, 75 | 0, 0, 75 |
| 88% | 50, 50, 50 | 0, 0, 50 |
| 100% | 0, 0, 0 | 0, 0, 0 |

In addition to the decreasing luminance apparent in the graph 550, the five stops at 22%-66% add an iridescent color cast that enhances visibility of the visual feedback indication 510b and is more readily identifiable than a greyscale indication, resulting in reduced time for a user to discover and interact with affordances in the virtual environment 180. With reference to the first point 520a and the second point 520b illustrated in FIG. 5C, in an example in which the stops in Table 1 are linearly interpolated, the feedback indication color value for the first pixel would be RGB(107, 102, 130) with luminance value of 116, and the feedback indication color value for the first pixel would be RGB(57, 57, 57) with luminance value of 57.

In some examples, values used for weighting or interpolation to determine feedback indication color values from stops such as the stops in Table 1, stop positions, and/or stop color values may be varied with time, providing an animated variation in luminance and/or pixel color for various distances from the virtual intersection 422b that enhances visibility of the visual feedback indication 510b and, in various circumstances, results in reduced time for a user to discover and interact with affordances in the virtual environment 180. Additionally, the animated variation in luminance and/or pixel color allows a visual feedback indication 510b that visually blends in with its surrounding in a frame (becoming "camouflaged" and difficult for a user to identify) at a first time to change in appearance such that at a second time the visual feedback indication 510b is more visible and identifiable within the same or similar surroundings.

FIG. 5C illustrates another approach to determining a degree of proximity of the points 520a, 520b, and 520c to the second virtual input line 420b, using a direct distance between the second virtual input line 420b and a point. For purposes of illustration, a radius 513 used for this approach is assumed to be equal to the radius 512. FIG. 5C illustrates a distance 540a (63% of the radius 513) for the first position 520a, a distance 540b (79% of the radius 513) for the second position 520b, and a distance 540c (97% of the radius 513) for the third position 520c. As all of the distances 540a, 540b, and 540c are less than the radius 513, the corresponding rasterized pixels would each display the visual feedback indication 510b. Pixel color values for rendering the visual feedback indication 510b may be determined according to function of a proximity of a position of the pixel on the surface 332 to the first virtual input line 420a may be applied for each of distances 540a, 540b, and 540c. In some implementations, the radius 512 may be used as a threshold distance value for a conditional logic operation used to determine whether a pixel is rendered to display the visual feedback indication 510b.

The approaches illustrated in FIG. 5C may be efficiently implemented by fragment and/or vertex shader programs, which may be selectively linked to surfaces on which the illustrated visual feedback indication is to be displayed. In some examples, a fragment shader is configured to generate pixel color values pixels displaying render visual feedback indication 510b with a single pass, which reduces power and computing resource demands, and reduces latency. In some implementations, a visual feedback indication is rendered by a combination of vertex and fragment shaders. In the vertex shader, a tangent space may be constructed that is centered approximately upon the virtual intersection 422a. In the fragment shader, this tangent space then may be used to determine an effect of a visual feedback indication on pixel color based on proximity, and render the resulting pixels. Pre-modeled UV spaces may be used for construction of graphical elements of the visual feedback indication, including, for example, for lines and background color.

In some examples, the radius 512 or the radius 513 may be configurable. For example, an interface and/or setting may be available to the user to adjust the size of the visual feedback indication 510b. The radius 512 or the radius 513 may specify an absolute size, resulting in the radius 512 or 513 spanning a smaller field of view for surfaces that are further away from the user. The radius 512 or the radius 513 may specify an angular size, resulting in the radius 512 or 513 spanning approximately the same field of view, regardless of distance. In some examples, an intensity of the visual feedback indication 510b may likewise be configurable, which may be implemented by adjusting a weighting between the feedback indication color value and the initial color value and/or changing color values used to determine feedback indication color values. In some examples, the visual feedback indication 510b may be less intense for more distant surfaces, to reduce visual distractions from surfaces that are less likely to be relevant for user interactions.

Figure 5D:
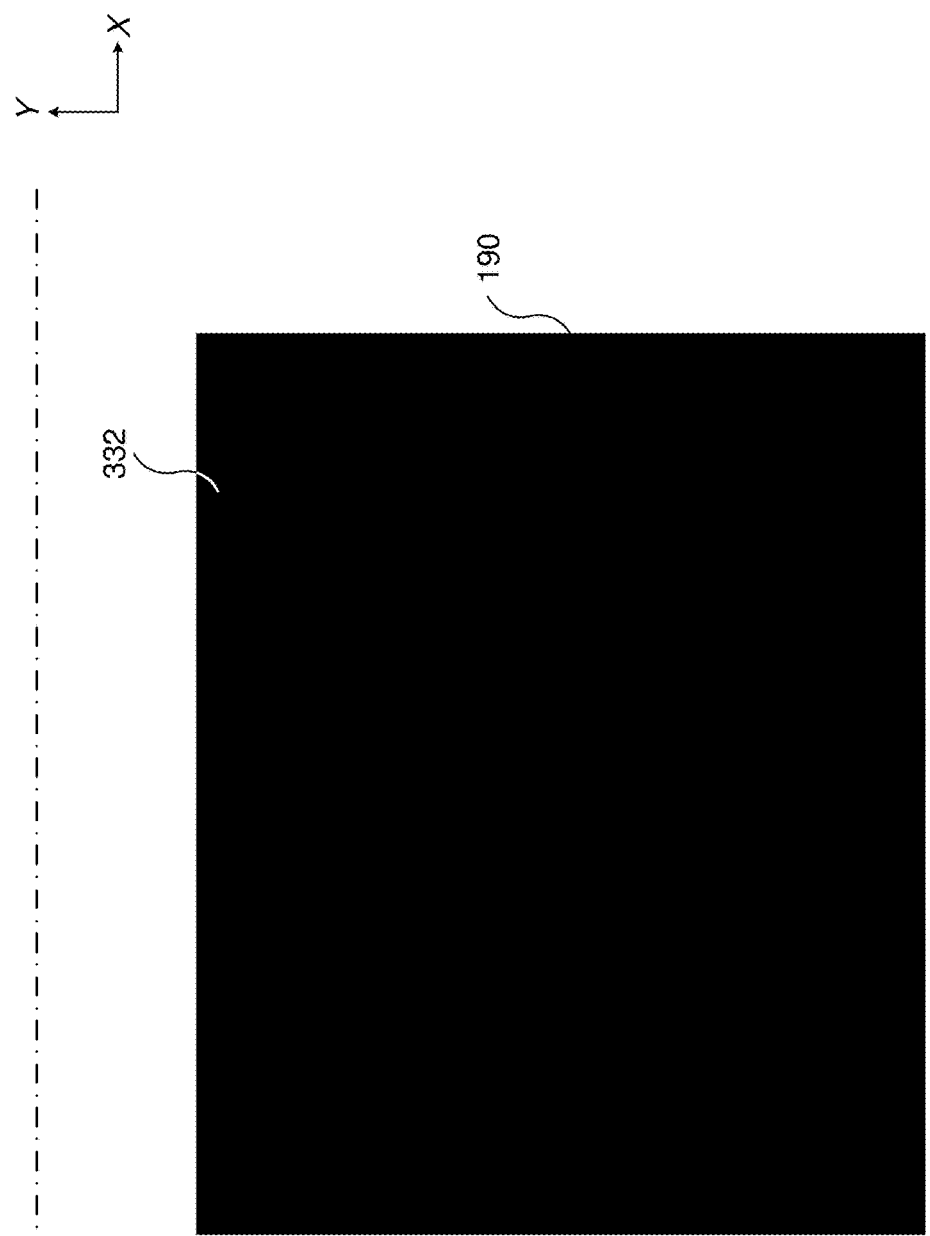
FIG. 5D illustrates an example portion of a rasterized frame in which a visual feedback indication is no longer rendered for the surface due to the third virtual input line shown in FIG. 4C not being in proximity to any rendered portion of the surface.

FIG. 5D illustrates an example portion of a rasterized frame 503 in which a visual feedback indication is no longer rendered for the surface 332 due to the third virtual input line 420c shown in FIG. 4C, reflecting a change in a corresponding hand motion input source pose, not being in proximity to any rendered portion of the surface 332. The conditions for generating the frame 503, including a corresponding hand motion input source pose, are as illustrated and described for FIG. 4C. As can be seen in FIG. 5D, none of the points on the surface 332 are within the radius 512 extended around the third virtual intersection 512. The techniques described in connection with FIGS. 5B and 5C are effective for identifying and appropriately rendering this condition.

FIG. 5E illustrates an example portion of a rasterized frame 504 in which the first virtual input line 420a intersects the surface 332 as illustrated in FIG. 5A, but a visual feedback indication 514 displayed around the first virtual intersection 422a is selectively rendered for pixels within the boundaries of the surface 332. Specifically, the visual feedback indication 514 is not rendered for the three regions 560a, 560b, and 560c, including the regions 560a and 560b having rendered positions within the radius 512 around the first virtual intersection 422a. In some examples, the three regions 560a, 560b, and 560c may correspond to one or more surfaces different from the surface 332, and which are not configured to render the visual feedback indication 514. In some examples, one or more of the regions 560a, 560b, and 560c may provide affordances, such as buttons, and the surface 332 surrounding the affordances is configured to render the visual feedback indication 514 to facilitate discovery of the affordances (by, for example, indicating that surface 332 is likely to contain one or more affordances and/or providing visual contrast between surface 332 and the affordances) and facilitate effective and efficient targeting of, and interaction with, the affordances. In some examples, one of more of the regions 560a, 560b, and 560c may display video, graphics, and/or text but lack affordances. In some examples, a degree of proximity of the first virtual input line 420a to the region 560a may be indicated in a different manner as a gradated or continuous function of the degree of proximity, such as, but not limited to, an amount of motion or a uniform change in color that varies in response to the degree of proximity.

Figure 5F:
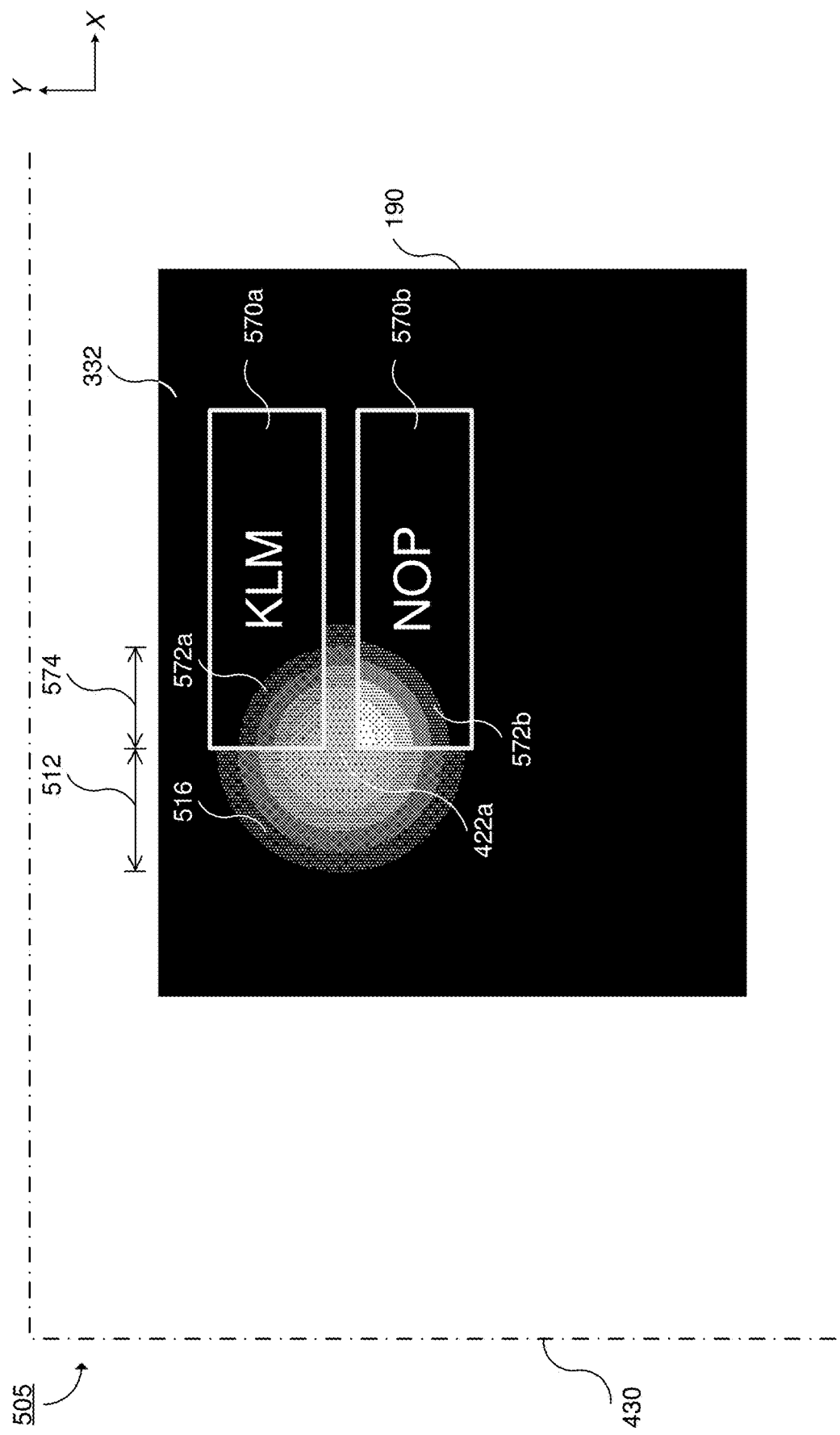
FIG. 5F illustrates an example portion of a rasterized frame in which the first virtual input line intersects the surface and a visual feedback indication is selectively rendered for the surface, and different visual feedback indications are rendered for pixels within other regions and within the boundaries of the surface.

FIG. 5F illustrates an example portion of a rasterized frame 505 in which the first virtual input line 420a intersects the surface 332 and a visual feedback indication 516 is selectively rendered for the surface 332, and different visual feedback indications 572a and 572b are rendered for pixels within other regions 570a and 570b within the boundaries of the surface 332. In this example, the visual feedback indication 516 is not rendered for the two regions 570a and 570b, much as described for the visual feedback indication 514 in FIG. 5E. The regions 570a and 570b may correspond to one or more surfaces different from the surface 332, and which are configured to render visual feedback indications differently. In some examples, one or more of the regions 570a and 570b may provide affordances, such as buttons. In some examples, one of more of the regions 570a and 570b may display video, graphics, and/or text but lack affordances. Within the region 570a, the visual feedback indication 572a is rendered in a different manner than the visual feedback indication 516. In some examples, a radius 574 that is different than radius 512 may be used.

In some examples, different visual feedback indications are effected by applying different functions of proximity of a position of a pixel to a virtual input line may be used to determine changes in pixel color for the different visual feedback indications 516, 572a, and 572b. The different functions may use, for example, different processes (such as, but not limited to, different shapes), parameters (such as, but not limited to, different radius values or positions of stops used for interpolation), and/or color values (such as, but not limited to, different colors for stops used for interpolation). For example, the visual feedback indication 516 may be rendered with low color saturation according one function, and the visual feedback indication 572a may be rendered with a more significant color cast (for example, causing the visual feedback indication 572a to be more yellow) according to another function. In some examples, different visual feedback indications with distinct appearances (for example, visibly distinct colorings) may be selected based on a property of a surface. For example, a first visual feedback indication may be used for affordances, or types of affordances, and a different visual feedback indication may be used for non-affordances. As another example, a second visual feedback indication may be used to indicate an enabled affordance and a different visual feedback indication may be used to indicate a disabled affordance. As another example, a third visual feedback indication may be used to indicate a default or preferred item and a different visual feedback indication may be used to indicate other items. As another example, a visual feedback indication may be selected to indicate surfaces that contain affordances, despite not being affordances themselves. In some examples, different visual feedback indications with distinct appearances may be selected based on a category or value associated with an item. For example, semantic labeling may be performed to categorize nearby real-world objects, and various visual feedback indications selected for virtual objects based on the category assigned to their real-world counterparts. Within the region 570b, a visual feedback indication 572b, different from the visual feedback indications 516 and 572a, is applied to, for example, indicate to a user it offers a different type of affordance than region 570a. By use of different visual feedback indications as described above for FIG. 5F, a user is able to better discover and identify affordances and other differences between surfaces and virtual objects through visible differences in the visual feedback indication rendered for various surfaces.

Various examples of devices, methods, and/or processes for interacting with virtual environments via hand tracking and/or an MR/VR device are described in connection with FIGS. 5A-5F. These devices, methods, and/or processes may be implemented using and/or in combination with the various devices, systems, elements, and features described above in connection with FIGS. 1-4D.

Figure 6:
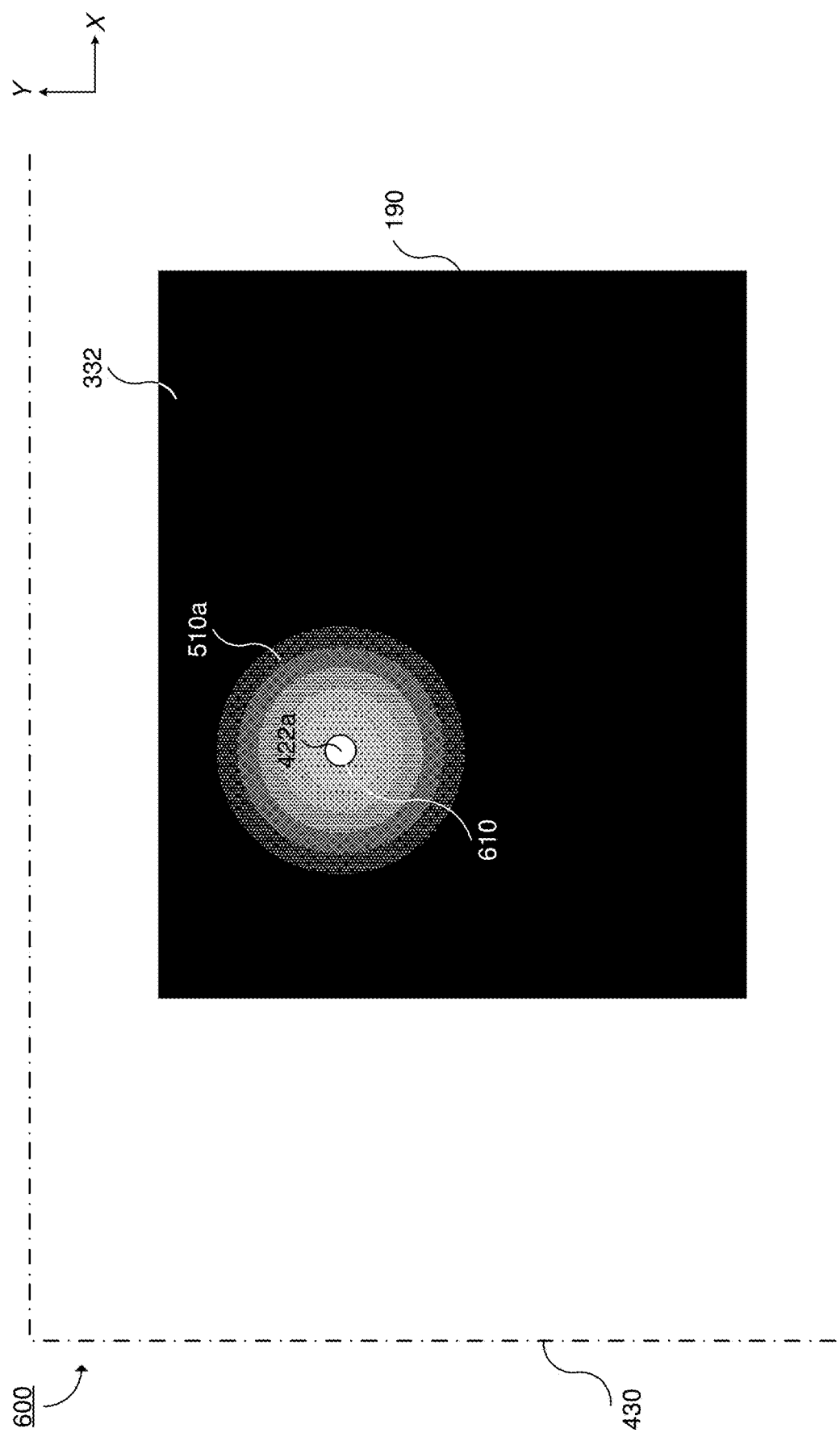
FIG. 6 illustrates an example portion of a rasterized frame including the visual feedback indication illustrated in FIG. 5A and further including a cursor positioned at or over the virtual intersection corresponding to the visual feedback indication.

FIG. 6 illustrates an example portion of a rasterized frame 600 including the visual feedback indication 510a illustrated in FIG. 5A and further including a cursor 610 positioned at or over the virtual intersection 422a corresponding to the visual feedback indication 510a. The conditions for generating the frame illustrated in FIG. 6, including a corresponding hand motion input source pose, are as illustrated and described for FIG. 4B. The rasterized frame 600 does not include the features illustrated with broken lines, may optionally include the black border illustrated around the cursor 610, and is displayed via the MR/VR device 140. In some examples, the cursor 610 may be selectively displayed in response to a visual feedback indication such as the visual feedback indication 510a being rendered. In such examples, the selective display of the cursor 610 reduces visual distraction of the cursor 610 in non-interactive portions of the virtual environment 180, improving a user's ability to observe features in such portions of the virtual environment 180 and more quickly and efficiently interact with the virtual environment 180. Additionally, in such examples, enabling display of the cursor 610 as it comes into proximity with surface 332 further focuses user attention on the point of interaction at virtual intersection 422a and facilitate precise and efficient targeting of affordances. Although FIG. 6 illustrates an example of the cursor 610 with a circular shape, other shapes may be used. Additionally, the cursor 610 may change color or shape to indicate changes in state, including available interactions. FIG. 6 illustrates examples of methods and/or processes for interacting with virtual environments via hand tracking and/or an MR/VR device. These methods and/or processes may be implemented using and/or in combination with the various devices, systems, elements, and features described above in connection with FIGS. 1-5E.

Figure 7A:
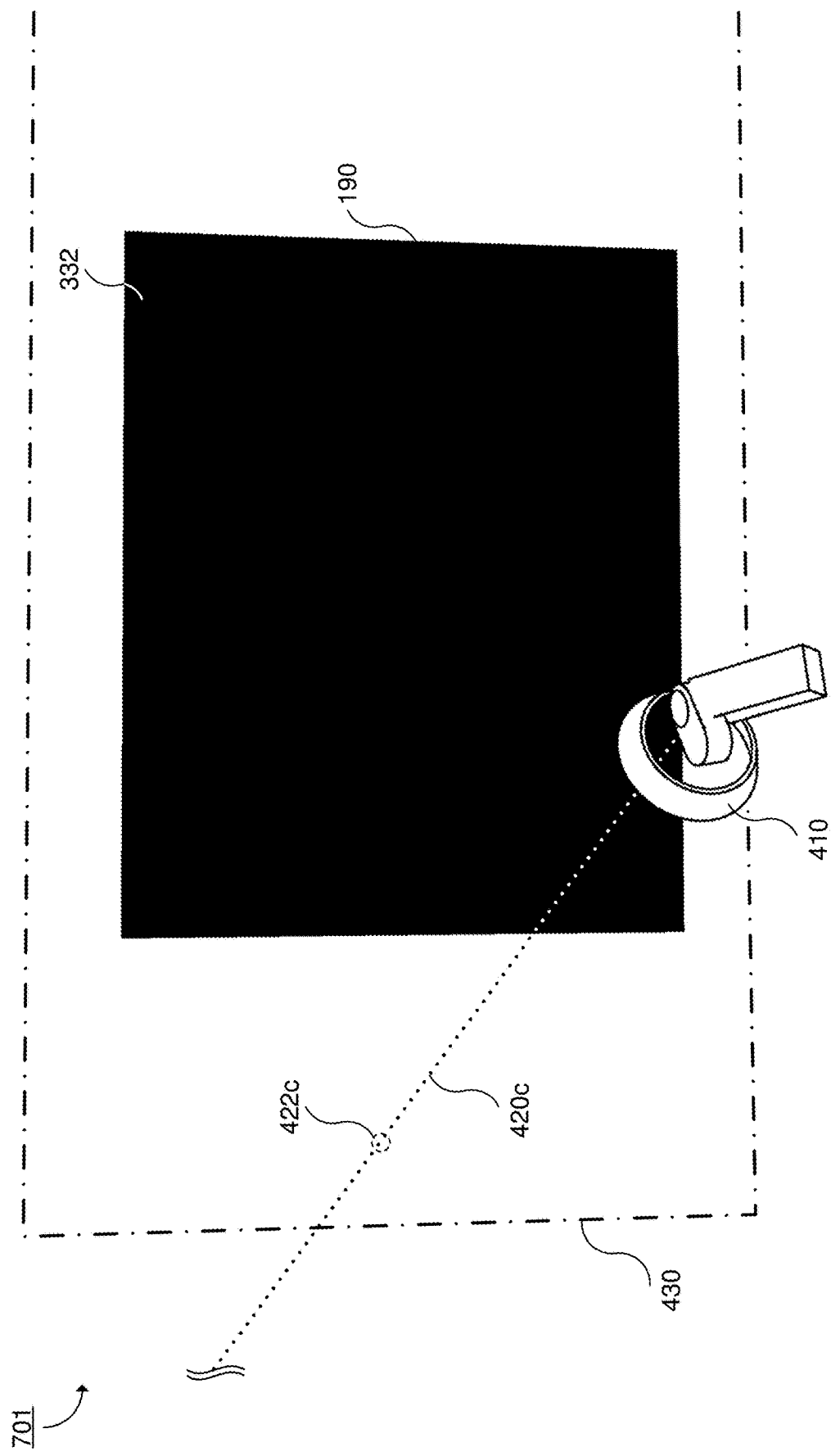
FIG. 7A illustrates an example rasterized frame corresponding to the example illustrated in FIG. 4C.

FIG. 7A illustrates an example rasterized frame 701 corresponding to the example illustrated in FIG. 4C. The frame 701 is rendered from the viewpoint of the virtual camera 312, and includes the avatar 410 associated with the hand motion tracking apparatus 150 being manipulated by the user's right hand 132. Features of FIG. 7A that are illustrated with broken lines, including the third virtual input line 420c, are not shown in the frame 701. However, the avatar 410 is oriented in accordance with its associated hand motion input source pose 340, thereby providing an approximate indication of the orientation of the third virtual input line 420c.

FIG. 7B illustrates an example rasterized frame 702 including, along with the other features rendered in the frame 701 illustrated in FIG. 7A, a beam 710 extending along the third virtual input line 420c. As the beam 710 is not intersecting a surface, it may extend out to an indefinite distance in the virtual environment 180. By showing the beam 710, the orientation of the virtual input line 420c extending from the hand motion input source pose is more precisely displayed via the MT device 140, but at the expense of an increased rendering load introduced by the beam 710, and an addition of a visual element extending through and across a significant range of the field of view displayed for the virtual environment 180 that may distract from, and interfere with observing, the virtual environment 180.

In some implementations, rendering of the beam 710 may be selectively enabled or disabled, by user action and/or under program control. For example, if the beam 710 is selectively toggled by a user, the user can selectively eliminate the distraction of the beam 710, and instead rely make use of the visual feedback indications such as visual feedback indications 510a and 510b to identify, locate, target, and interact with affordances in the virtual environment 180. However, the option also remains for the user to enable the beam 710 as appropriate circumstances arise. In some examples, a computer program can selectively enable or disable the beam 710 for various operations or states. In some examples, an operating system may be configured to disable the beam 710 when it is no longer directed at and/or proximate to virtual object instantiated by a computer program that has enabled the beam. In some implementations, a color or other aspect of a visual appearance of the beam 710 may be changed by a computer program, such as to indicate a change in program state.

Figure 7C:
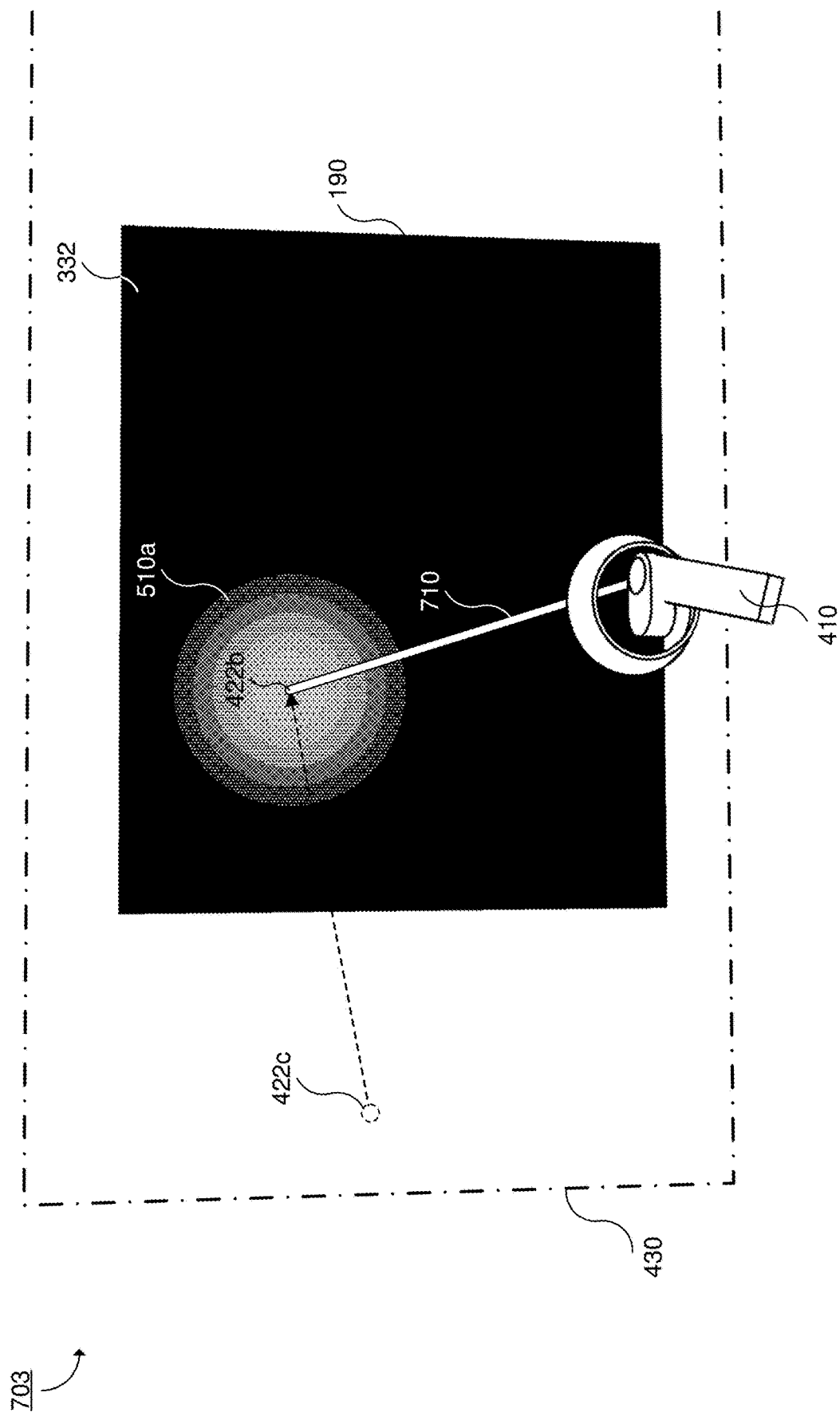
FIG. 7C illustrates an example rasterized frame including the beam shown in FIG. 7B, in which the hand motion input source pose has moved from the pose illustrated in FIG. 7B to the pose illustrated in FIG. 5A.
Figure 7D:
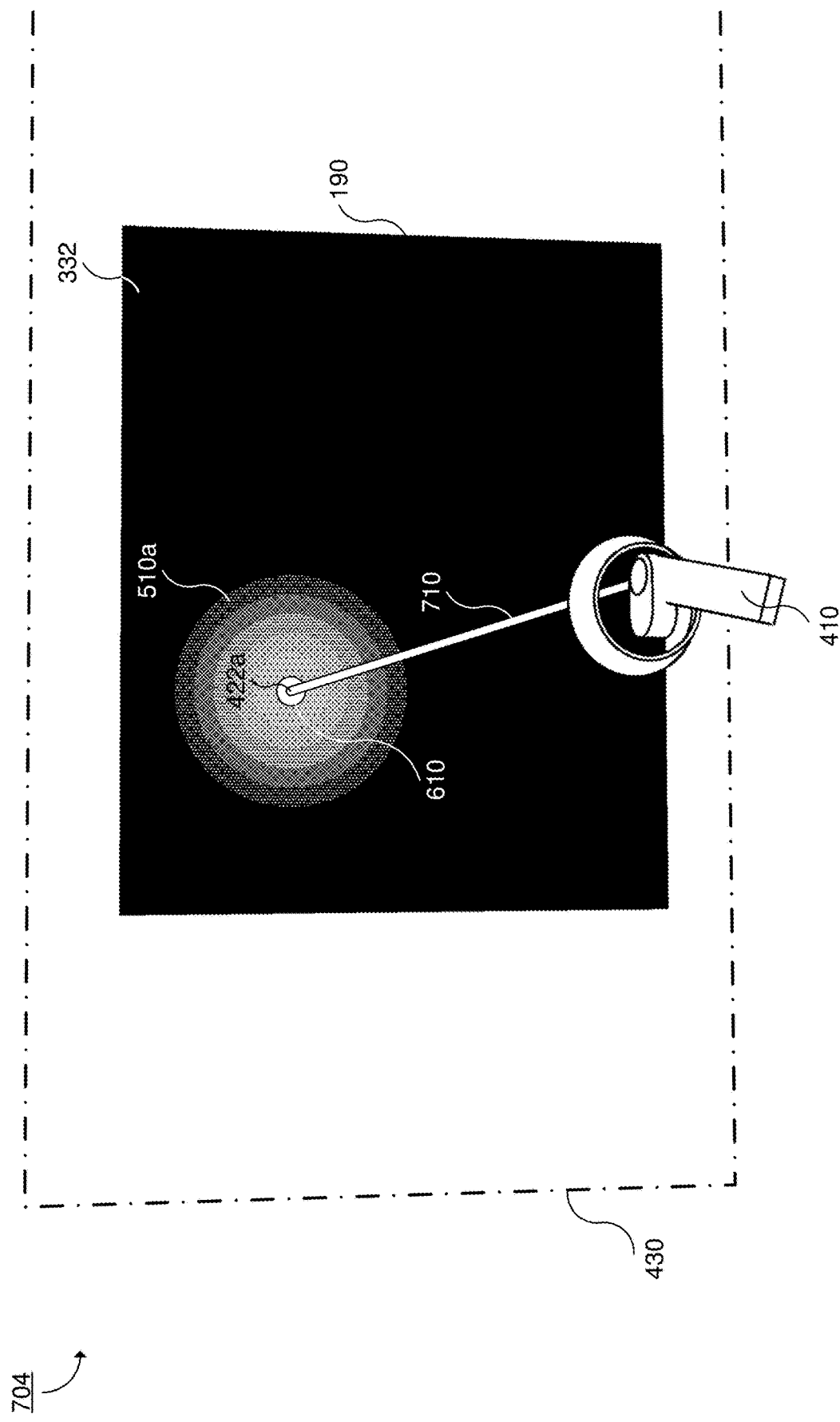
FIG. 7D illustrates an example rasterized frame including, along with the other features rendered in the frame illustrated in FIG. 7C, the cursor illustrated in and described for FIG. 6.

FIG. 7C illustrates an example rasterized frame 703 including the beam 710 shown in FIG. 7B, in which the hand motion input source pose has moved from the pose illustrated in FIG. 7B to the pose illustrated in FIG. 5A. As illustrated in and described for FIG. 5A, the visual feedback indication 510a centered at the virtual intersection 422b is rendered. Accordingly, FIG. 7C illustrates operation of an implementation configured to concurrently display the visual feedback indication 510a and the beam 710. FIG. 7D illustrates an example rasterized frame 704 including, along with the other features rendered in the frame 703 illustrated in FIG. 7C, the cursor 610 illustrated in and described for FIG. 6. Much as described above, the cursor 610 and/or the beam 710 may be selectively enabled, disabled, and/or modified in appearance under user and/or program control.

Figure 7E:
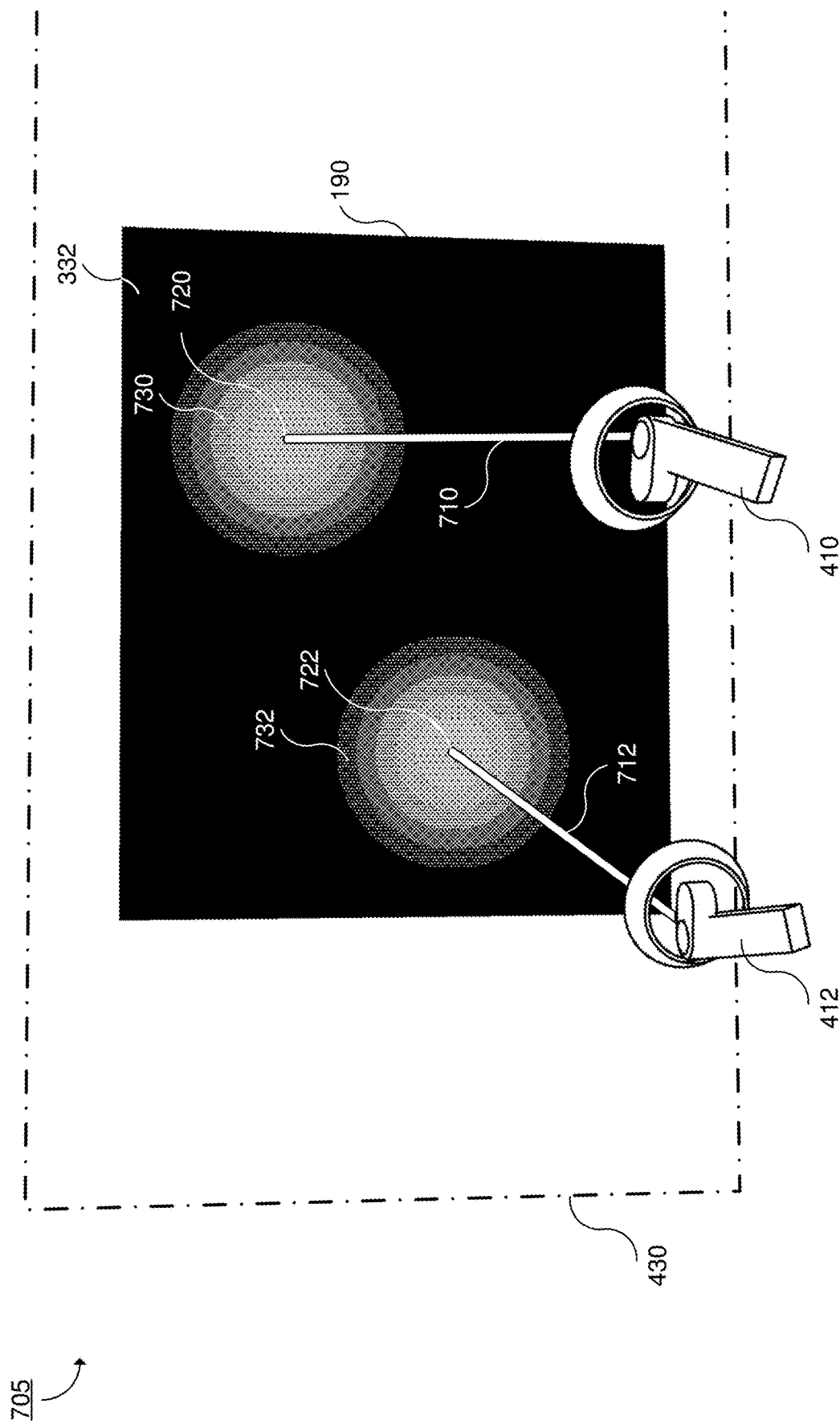
FIG. 7E illustrates an example rasterized frame showing user interacting with the virtual environment by using a second hand motion tracking apparatus held in and manipulated using the user's left hand in combination with the first hand motion tracking apparatus held in and manipulated using the user's right hand.

FIG. 7E illustrates an example rasterized frame 704 showing user 130 interacting with the virtual environment 180 by using a second hand motion tracking apparatus held in and manipulated using the user's left hand 134 in combination with the first hand motion tracking apparatus 150 held in and manipulated using the user's right hand 132. The second hand motion tracking apparatus operates as an element of the three-dimensional hand motion tracking system 160, much as described for the first hand motion tracking apparatus 150. Based on respective estimated poses and/or pose changes in the physical environment 100 generated by the three-dimensional hand motion tracking system 160 for the first and second hand motion tracking apparatuses, a first hand motion input source pose associated with the first hand motion tracking apparatus 150 and a second hand motion input source pose associated with the second hand motion tracking apparatus are determined. As described above, the avatar 410 is arranged in the virtual environment 180 according to the first hand motion input source pose Likewise, a second avatar 412 is also included in the virtual environment 180 and arranged according to the second hand motion input source pose.

In the example illustrated in FIG. 7E, both of the first and second hand motion input source poses are directed toward the surface 332 of the virtual object 190. A first virtual input line (not illustrated in FIG. 7E) extending from the first hand motion input source pose intersects the virtual surface 430 at a virtual intersection 720, and a visual feedback indication 730 centered at the virtual intersection 720 is rendered for the surface 332. Likewise, a second virtual input line (not illustrated in FIG. 7E) extending from the second hand motion input source pose intersects the virtual surface 430 at a virtual intersection 722, and a visual feedback indication 730 centered at the virtual intersection 720 is rendered for the surface 332. Much as described in connection with FIGS. 7B and 7C, a first beam 710, extending from the first avatar 410 to the virtual intersection 720, and a second beam 712, extending from the second avatar 712 to the virtual intersection 722 are rendered in the frame 705. In some examples, as illustrated in and described for FIG. 6, cursors may be displayed at virtual intersections 720 and 722. In some examples, as discussed above, either or both of the first beam 710 and the second beam 712 may be selectively enabled, disabled, and or changed in appearance.

Various examples of devices, methods, and/or processes for interacting with virtual environments via hand tracking and/or an MR/VR device are described in connection with FIGS. 7A-7E. These devices, methods, and/or processes may be implemented using and/or in combination with the various devices, systems, elements, and features described above in connection with FIGS. 1-6.

Figure 8A:
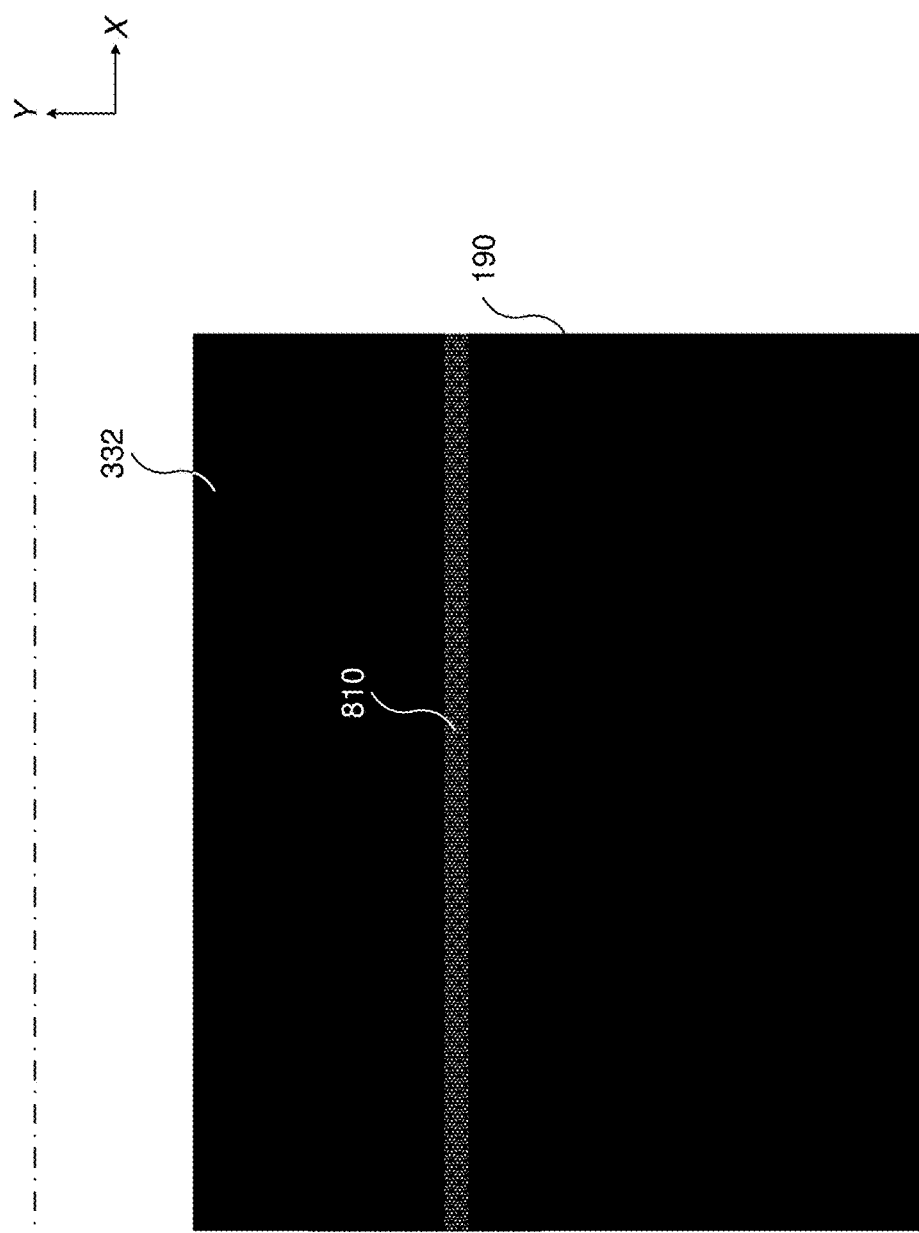
FIG. 8A illustrates an example portion of a rasterized frame in which the surface includes a line element configured to render a visual feedback indication showing a degree of proximity of a virtual input line to rendered portions of the line element.

FIG. 8A illustrates an example portion of a rasterized frame 801 in which the surface 332 includes a line element 810 configured to render a visual feedback indication showing a degree of proximity of a virtual input line to rendered portions of the line element 810. Line element 810 is a graphical element which may also be referred to as a "line-based graphical element." The conditions for generating the frame 801, including use of a corresponding hand motion input source pose, are as illustrated and described for FIG. 4C. However, much as occurred in FIG. 5D, since the hand motion input source pose is not oriented directly toward a portion of the line element 810, nor is it oriented in close proximity to the line element 810 (which, in some implementations, may be determined based on a radius 820). As a result, a default pixel color (in this example, having a low luminosity) is used for pixels rendered in frame 801 for the line element 810. Although the line element 810 is illustrated as a single straight line segment fully extending across the surface 332 and/or the virtual object 190, this is merely a simplified example for purposes of discussion. The term "line element" also encompasses a line strip element, with line segments extending to successive vertices, which may be similarly configured to render a visual feedback indication showing a degree of proximity of a virtual input line to portions of the line strip element. Additionally, multiple line elements similarly configured to render a visual feedback indication showing a degree of proximity of a virtual input line may be included in and/or on a surface or virtual object.

Figure 8B:
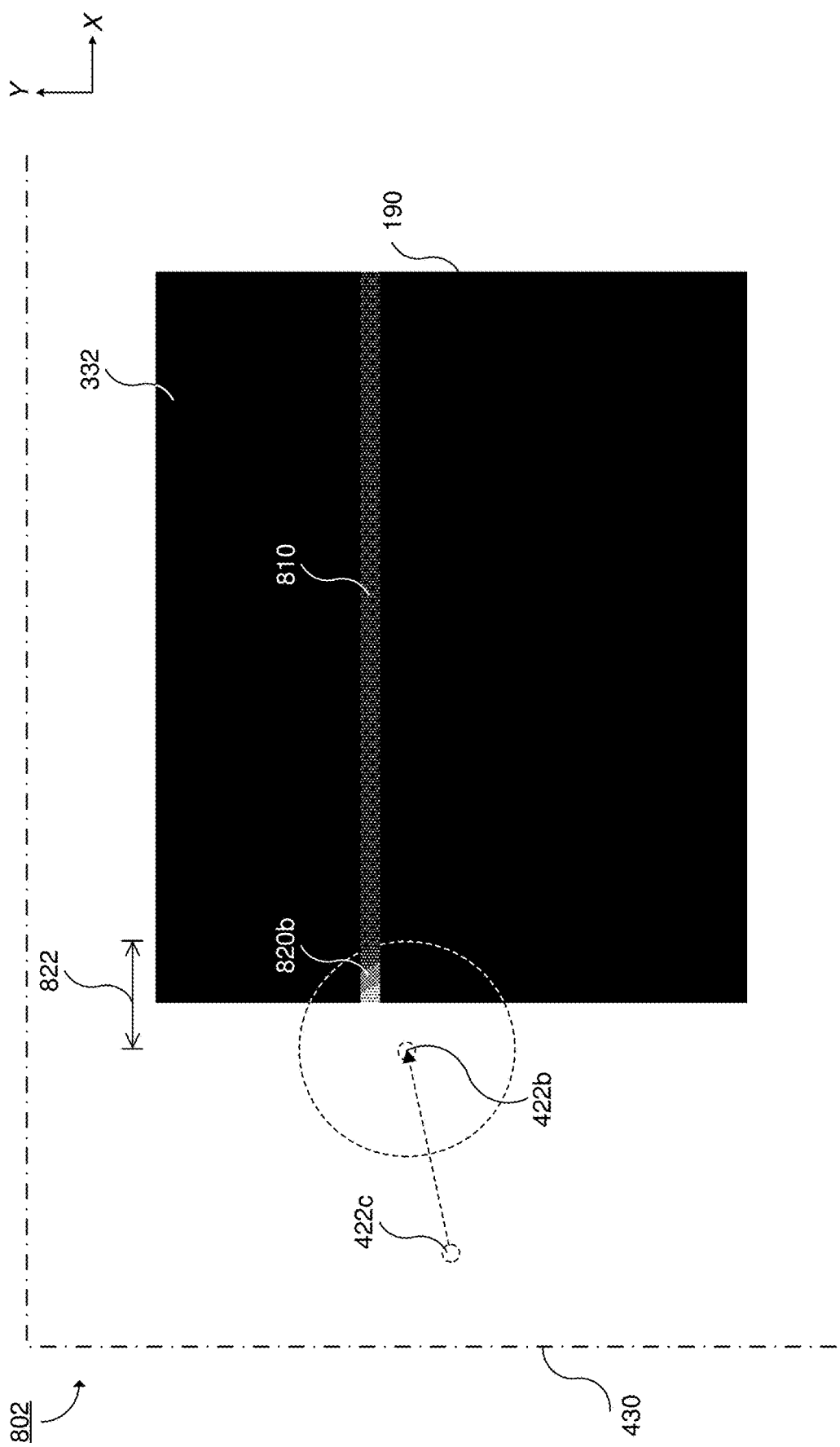
FIG. 8B illustrates an example of a portion of a rasterized frame including a visual feedback indication that has been rendered to indicate a degree of proximity of the second virtual input line to rendered portions of the line element shown in FIG. 8A.

FIG. 8B illustrates an example of a portion of a rasterized frame 802 including a visual feedback indication 820b that has been rendered to indicate a degree of proximity of the second virtual input line 420b to rendered portions of the line element 810 shown in FIG. 8A. The conditions for generating the frame 802, including use of a corresponding hand motion input source pose, are as illustrated in and described for FIG. 4B. Similar to the rendering of the visual feedback indication 510b in FIG. 5B, the rasterized pixels for the line element 810 displaying the visual feedback indication 820b are within a circle with a center at the second virtual intersection 422b and with the radius 822. The various features and techniques described in connection with FIGS. 5A-7E for rendering visual feedback indications 510a, 510b, 514, 730, and 732 may be used for determining pixel color values rendered in frame 802 for pixels displaying the visual feedback indication 820b. In some implementations, an advantage achieved with rendering a visual feedback indication such as the visual feedback indication 820b is that the process of rendering the pixels for the line element 810 includes antialiasing of the pixels for the line element 810, which allows a reasonable quality image to be generated for frame 802 without an additional antialiasing pass for the entire frame 802. This offers a significant reduction in latency imposed by the rendering pipeline. It also avoids a significant amount of processing, which in turn reduces heat generated in rendering the frame 802, reduces energy consumption, and makes resources available for other tasks and/or allows use of mobile graphics processing units, which have substantially less resources than their desktop computer counterparts. Many of these benefits are significant considerations in a self-contained MR/VR device, such as the Microsoft HoloLens.

Figure 8C:
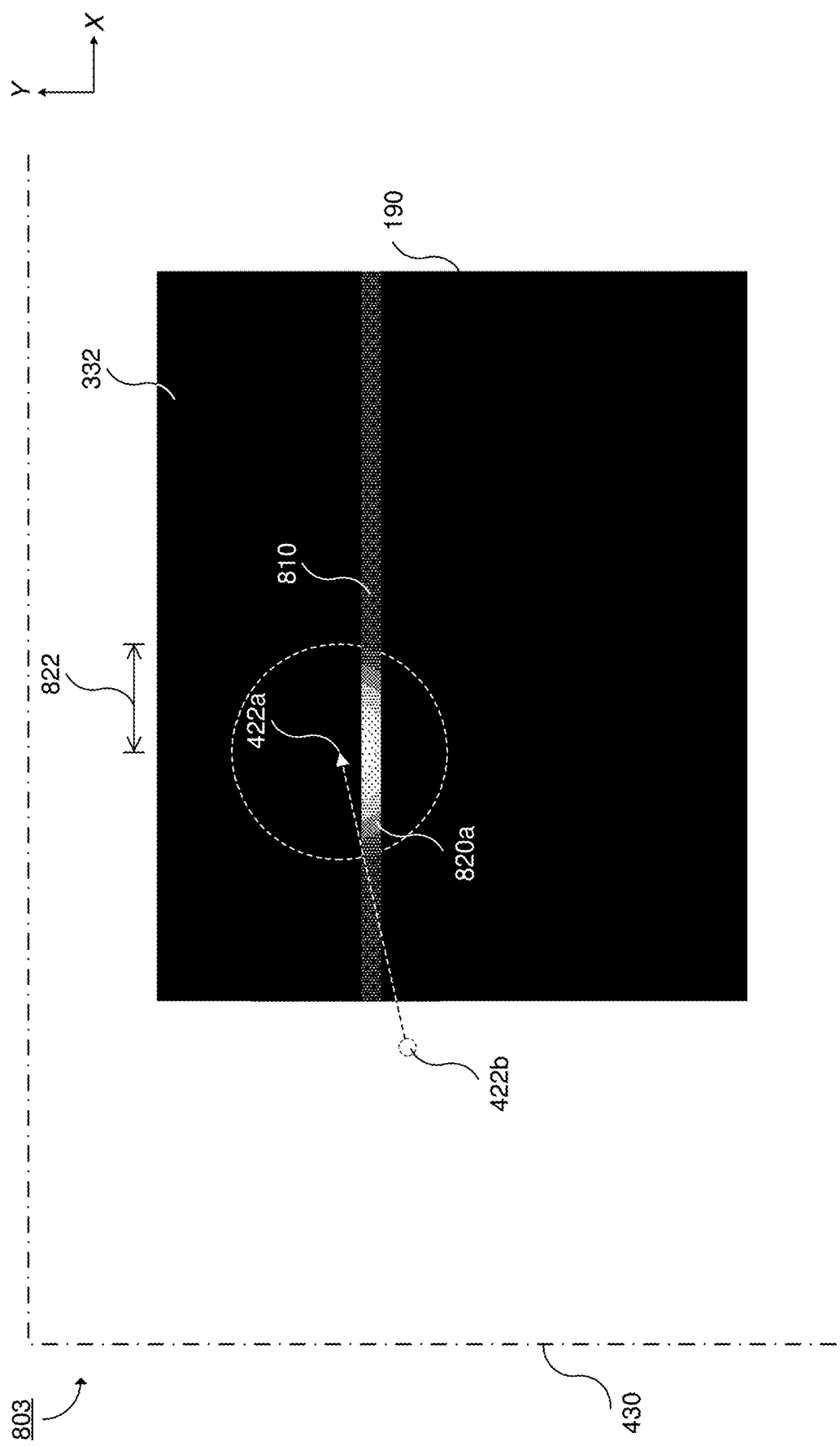
FIG. 8C illustrates an example of a portion of a rasterized frame including a visual feedback indication that has been rendered to indicate a degree of proximity of the first virtual input line to rendered portions of the line element shown in FIGS. 8A and 8B.

FIG. 8C illustrates an example of a portion of a rasterized frame 803 including a visual feedback indication 820a that has been rendered to indicate a degree of proximity of the first virtual input line 420a to rendered portions of the line element 810 shown in FIGS. 8A and 8B. The conditions for generating the frame 803, including use of a corresponding hand motion input source pose, are as illustrated in and described for FIG. 4A. The result is similar to the results seen in FIG. 8B, but with the virtual intersection 422a being positioned in closer proximity to the line element 810 and away from an end of the line element 810, the visual feedback indication 820a is larger and more strongly displays the proximity than the visual feedback indication 820b shown in FIG. 8B.

Figure 8D:
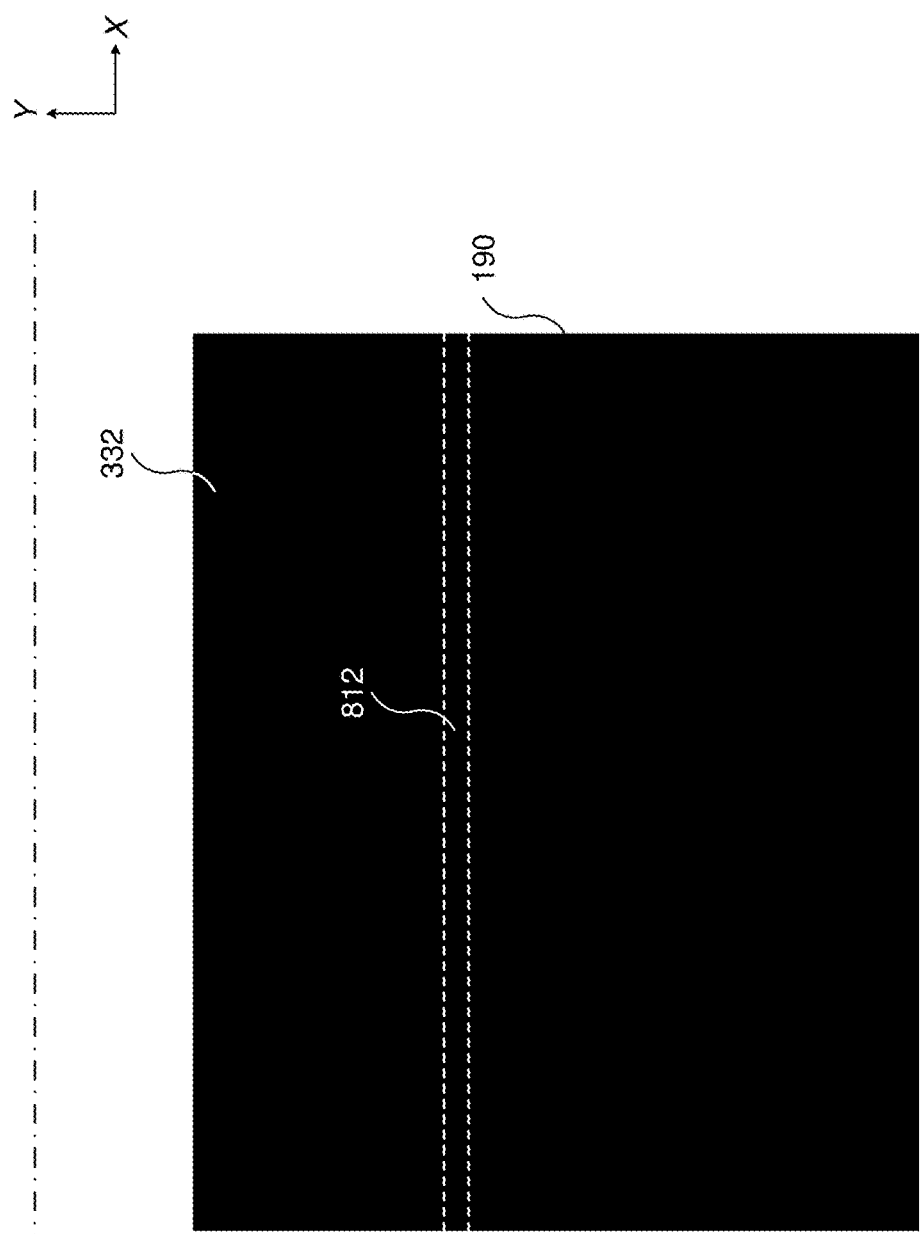
FIGS. 8D, 8E, and 8F illustrate a series of rendered frames which are similar to the frames illustrated in FIGS. 8A, 8B, and 8C, except that the surface and/or the virtual object include a different line element, which is ordinarily not visible when a virtual input line is not directed on or proximate to the line element.
Figure 8E:
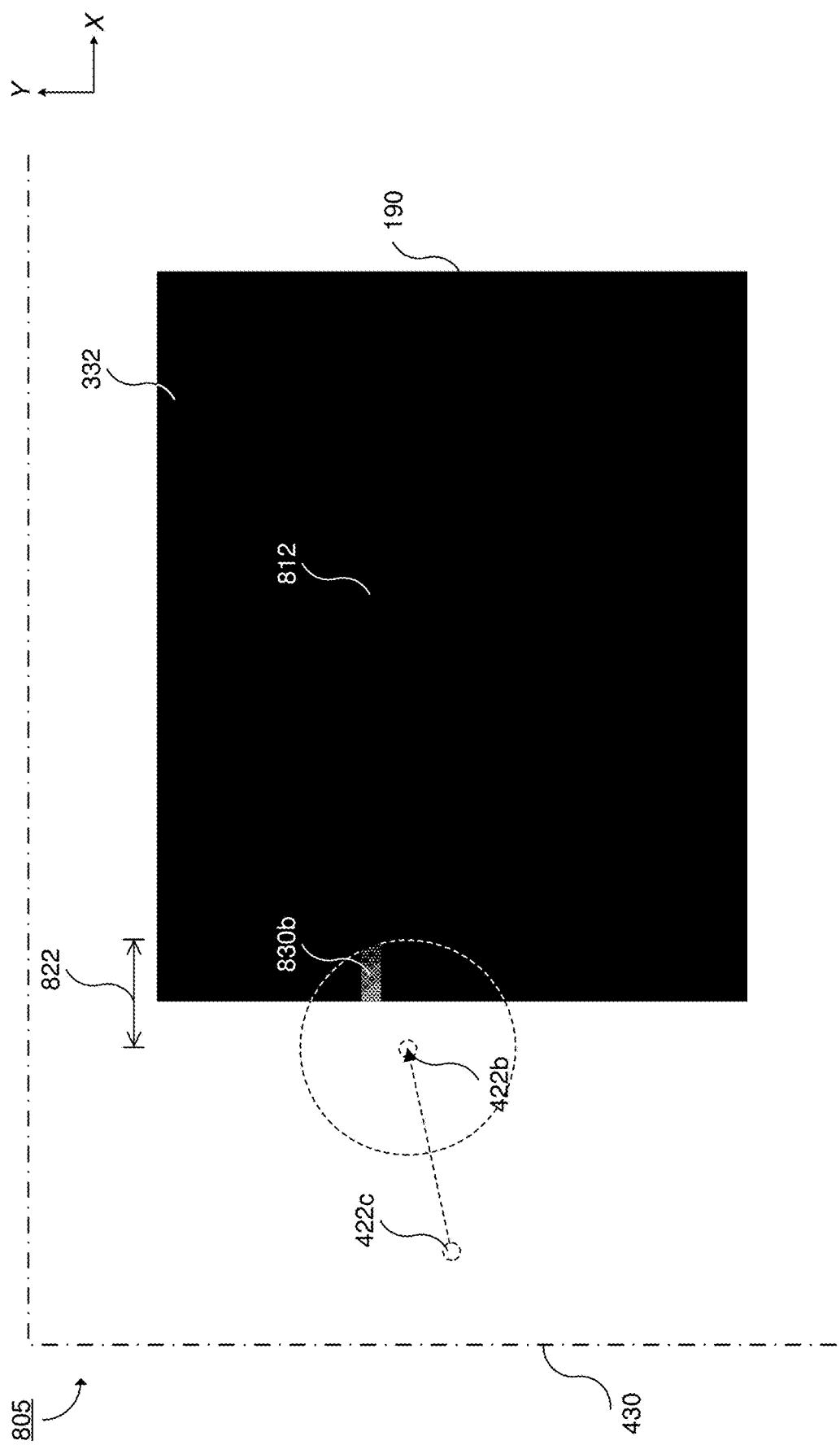
Figure 8F:
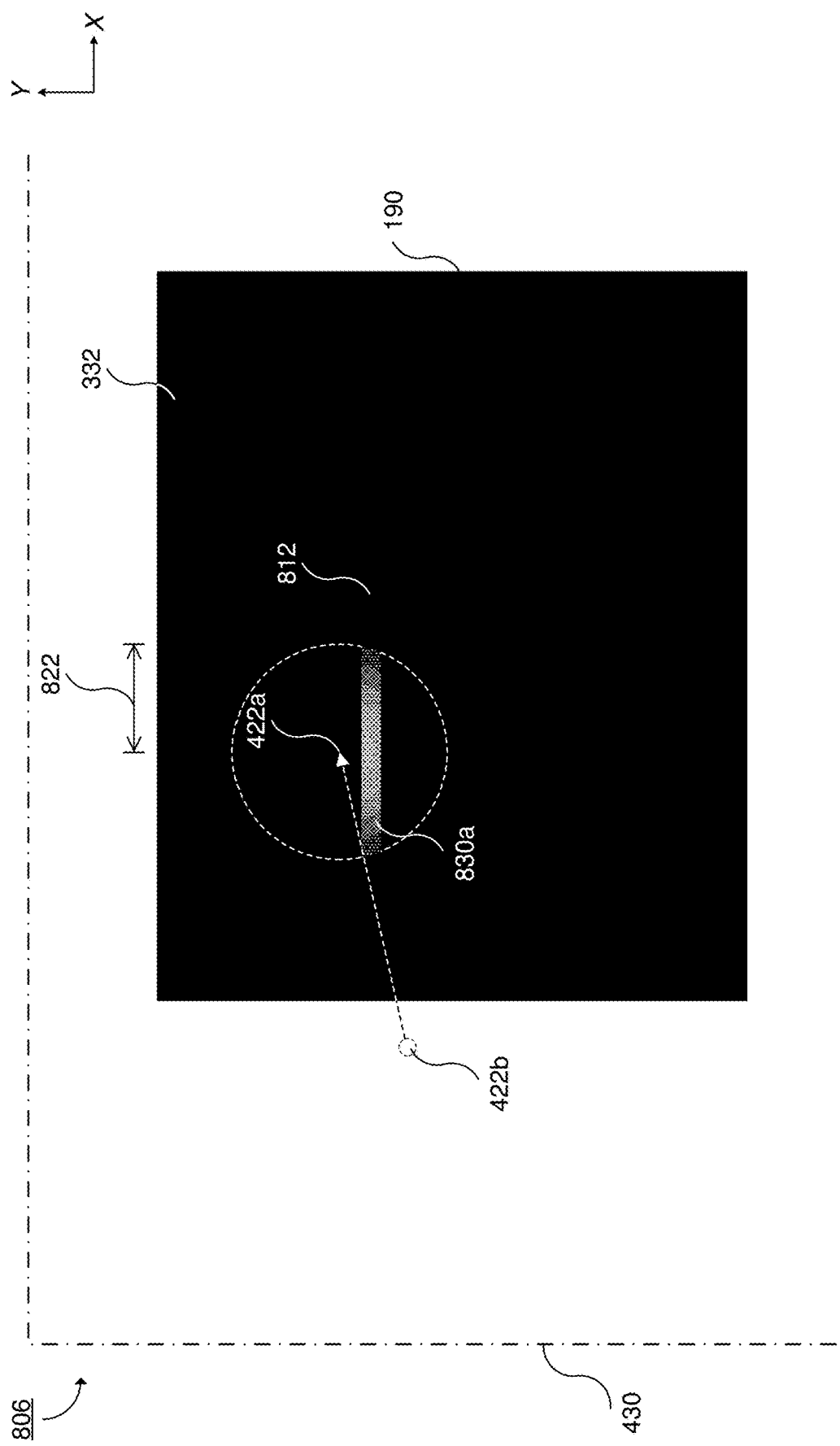

FIGS. 8D, 8E, and 8F illustrate a series of rendered frames 804, 805, and 806, which are similar to the frames 801, 802, and 803 illustrated in FIGS. 8A, 8B, and 8C, except that the surface 332 and/or the virtual object 190 include a different line element 812, which is ordinarily not visible when a virtual input line is not directed on or proximate to the line element 812. However, the line element 812 is configured to render a visual feedback indication showing a degree of proximity of a virtual input line to rendered portions of the line element 812. In FIG. 8D, as with FIG. 8A, no such visual feedback indication is displayed. As a result, the line element 812 is not visible as a discrete element. The white dashed lines in FIG. 8D are merely provided to illustrate the location of the line element 812 to the reader, and are not rendered in the frame 804. In FIG. 8E, a visual feedback indication 830b, similar in position, size and shape to the visual feedback indication 820b in FIG. 8B, is rendered for the line element 812. With this, an end of the line element 812 is visible in frame 805, although most of the line element 812 remains not visible. In FIG. 8F, a visual feedback indication 830a, similar in position, size and shape to the visual feedback indication 820a in FIG. 8C, is rendered for the line element 812, making an additional portion of the line element 812 visible.

Figure 8G:
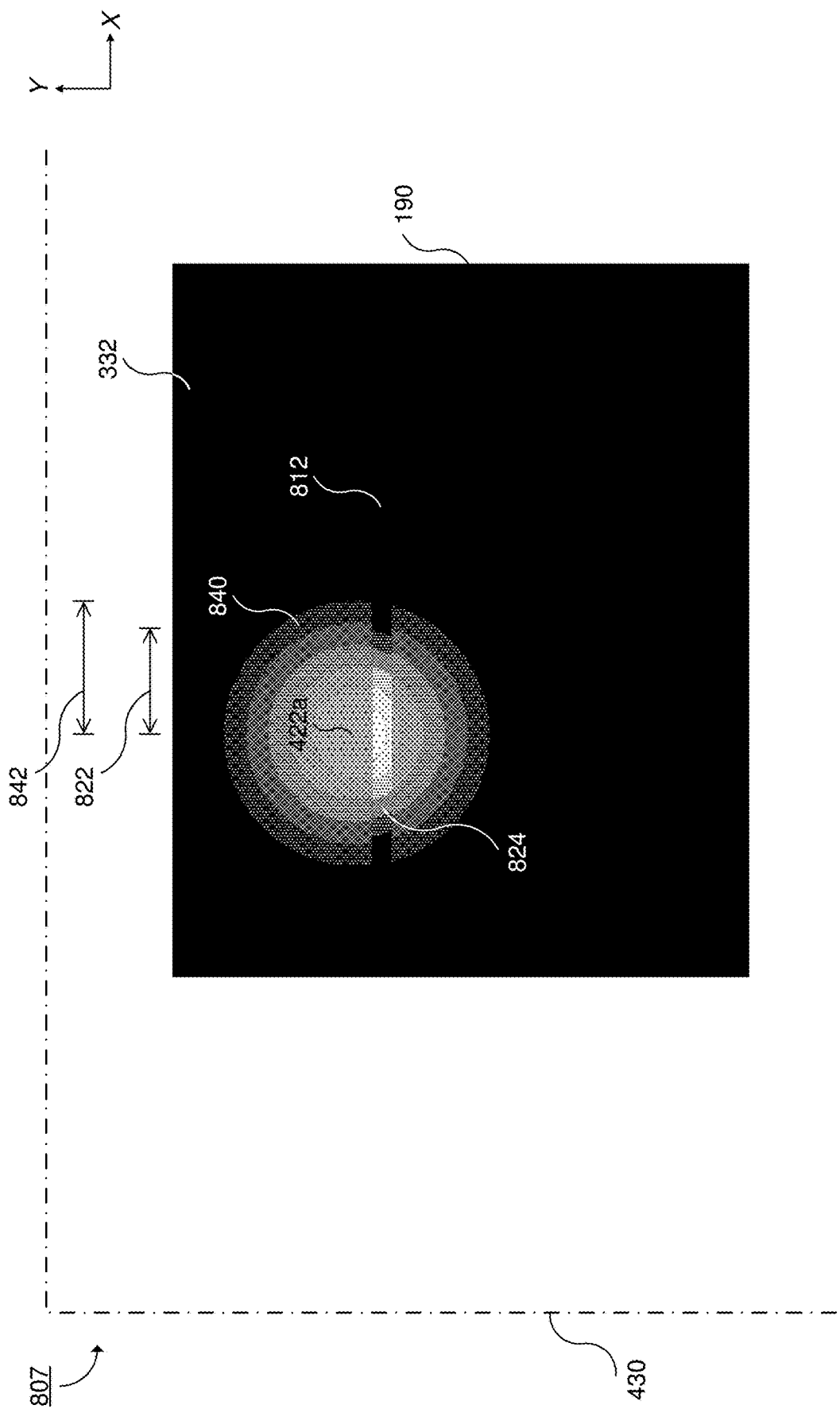
FIG. 8G illustrates an example portion of a rasterized frame similar to the example in FIG. 8F, and further including a visual feedback indication that is similar to the visual feedback indication rendered for the surface in FIG. 5A.

FIG. 8G illustrates an example portion of a rasterized frame 807 similar to the example in FIG. 8F, and further including a visual feedback indication 840 that is similar to the visual feedback indication 510a rendered for the surface 332 in FIG. 5A. The conditions for generating the frame 807, including use of a corresponding hand motion input source pose, are as illustrated in and described for FIG. 4A, and are the same as the conditions in FIG. 8F. Much as in FIG. 5A, the visual feedback indication 840 is rendered for pixels of the surface 332 within a circle with a center at the virtual intersection 422a and a radius 842, although the visual feedback indication 840 is not rendered for pixels associated with the line element 812. Much as in FIG. 8F, a visual feedback indication 824 is rendered for the line element 812 based on proximities of pixels within the radius 822 to the first virtual intersection 422a.

In some examples, such as in the example illustrated in FIG. 8G, the visual feedback indication 824 is different than the visual feedback indication 840. For example, by applying different functions of proximity of a position of a pixel to a virtual input line to determine rendered pixel color values. In the example in FIG. 8G, the radius 842 is larger than radius 822, resulting in different visual feedback indications that provide a clear visual delineation between the line element 812 and portions of the surface 332. In some examples, such as in the example illustrated in FIG. 8G, the visual feedback indication 840 has a lower luminance than the visual feedback indication 824 for the same distances, providing a visual contrast between the line element 812 and portions of the surface 332.

Figure 9A:
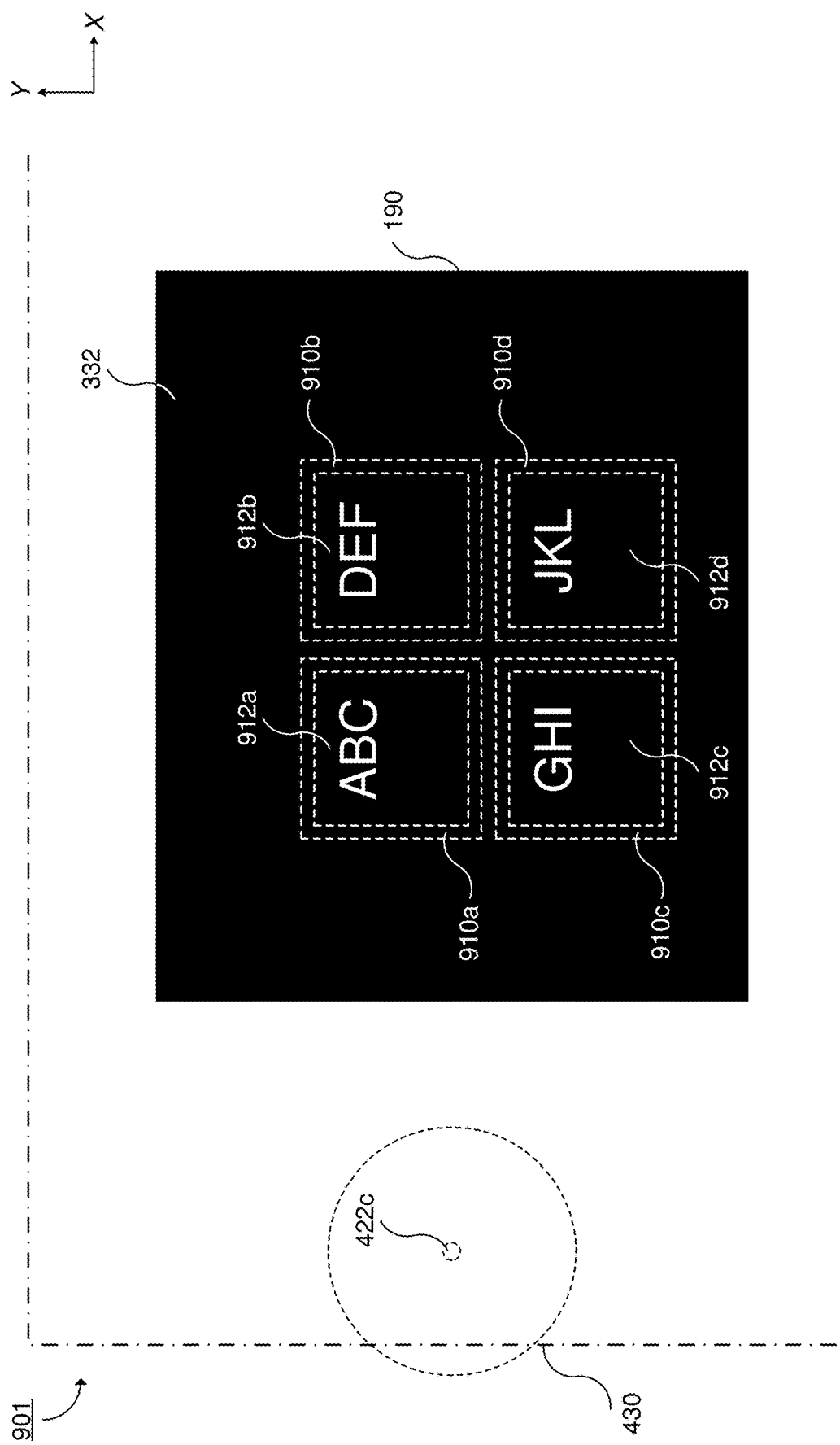
FIG. 9A illustrates an example portion of a rasterized frame in which the surface or the virtual object includes four line strip elements that are rendered much as described for the line element illustrated in FIGS. 8D-8F.

FIG. 9A illustrates an example portion of a rasterized frame 901 in which the surface 332 or virtual object 190 includes line strip elements 910a, 910b, 910c, and 910d that are rendered much as described for the line element 812 illustrated in FIGS. 8D-8F. Each of the line strip elements 910a, 910b, 910c, and 910c includes multiple line segments forming a rectangle surrounding a respective one of affordances 912a, 912b, 912c, and 912d. The number, size, arrangement, appearance, and types of elements illustrated in FIG. 9A is merely for illustrative purposes, and is not intended to be limit the arrangements of elements to which the described techniques may be applied. The conditions for generating the frame 901, including use of a corresponding hand motion input source pose, are as illustrated in and described for FIG. 4C, and are the same as the conditions in FIG. 8D. As a result, and as with line element 812 in FIG. 8D, none of the line strip elements 910a, 910b, 910c, and 910d are visible as discrete elements. However, text displayed on each of the affordances 912a, 912b, 912c, and 912d is visible.

Figure 9B:
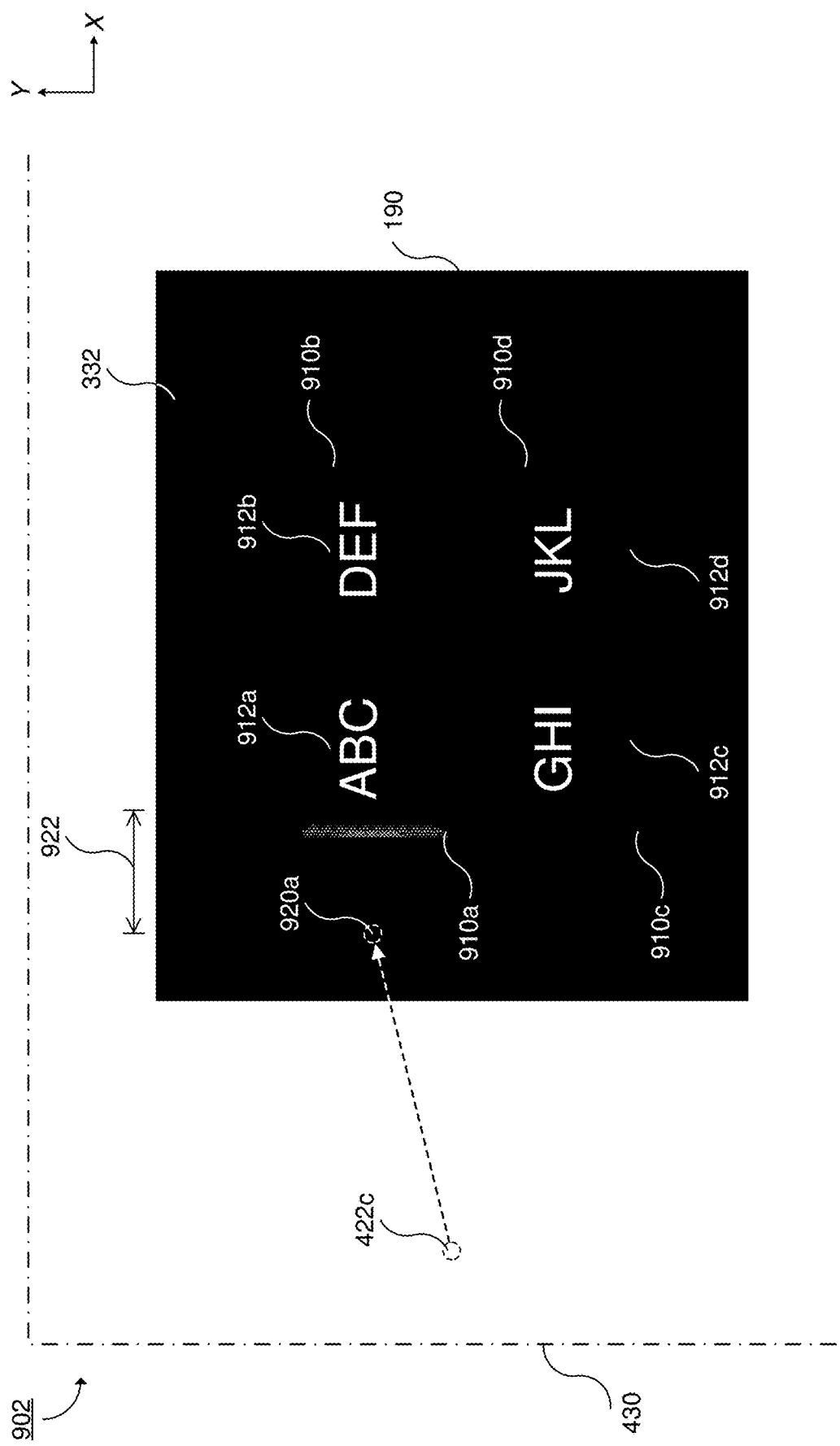
FIG. 9B illustrates an example portion of a rasterized frame in which the hand motion input source pose has changed from the hand motion input source pose for FIG. 9A, resulting in a corresponding virtual input line intersecting the virtual surface at virtual intersection.

FIG. 9B illustrates an example portion of a rasterized frame 902 in which the hand motion input source pose has changed from the hand motion input source pose for FIG. 9A, resulting in a corresponding virtual input line intersecting the virtual surface 430 at virtual intersection 920a. Pixels rendered for a left hand portion of the line strip element 910a display a visual feedback indication of their respective proximities to the virtual intersection 920a. The remaining portion of the line strip element 910a (outside of the radius 922 distance from the virtual intersection 920a) is not visible. Also, as in FIG. 9A, none of the line strip elements 910b, 910c, and 910d are visible as discrete elements.

Figure 9C:
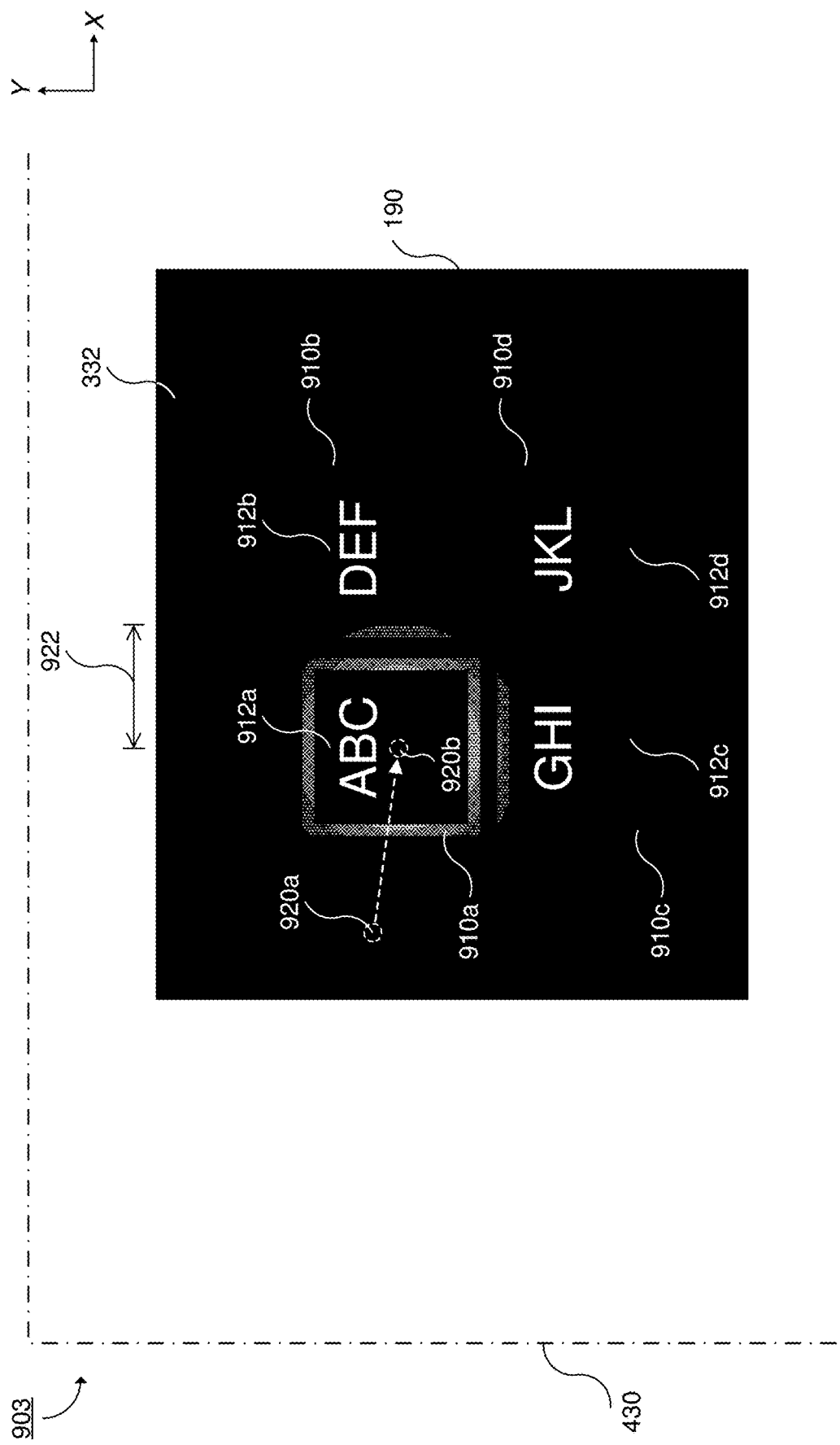
FIG. 9C illustrates an example portion of a rasterized frame in which the hand motion input source pose has changed from the hand motion input source pose for FIG. 9B, resulting in a corresponding virtual input line intersecting the virtual surface at virtual intersection.

FIG. 9C illustrates an example portion of a rasterized frame 903 in which the hand motion input source pose has changed from the hand motion input source pose for FIG. 9B, resulting in a corresponding virtual input line intersecting the virtual surface 430 at virtual intersection 920b.

Nearly all of the pixel positions for the line strip element 910a display a visual feedback indication of their respective proximities to the virtual intersection 920b, clearly indicating the boundaries of the affordance 912a. Additionally, pixels rendered for portions of line strip elements 910b and 910c adjacent to the line strip element 910a display a visual feedback indication of their respective proximities to the virtual intersection 920b, providing an indication of the presence of affordances 912b and 912c on the virtual object 190. The remaining portions of the line strip elements 910a, 910b, and 910c (outside of the radius 922 distance from the virtual intersection 920b) are not visible. Also, as in FIGS. 9A and 9B, the line strip element 910d is not visible as a discrete element.

Figure 9D:
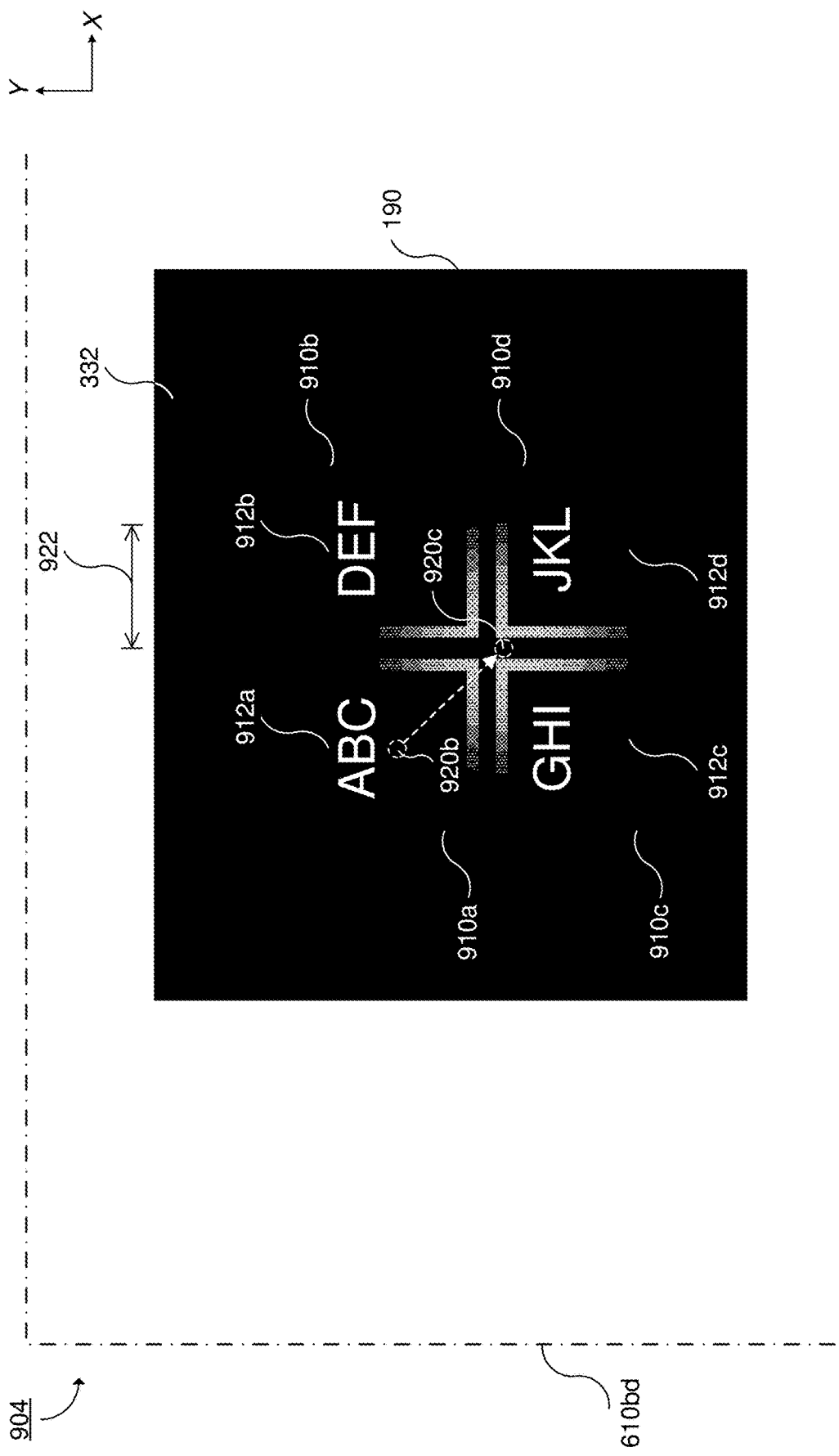
FIG. 9D illustrates an example portion of a rasterized frame in which the hand motion input source pose has changed from the hand motion input source pose for FIG. 9C, resulting in a corresponding virtual input line intersecting the virtual surface at virtual intersection.

FIG. 9D illustrates an example portion of a rasterized frame 904 in which the hand motion input source pose has changed from the hand motion input source pose for FIG. 9C, resulting in a corresponding virtual input line intersecting the virtual surface 430 at virtual intersection 920c. With the hand motion input source pose directed at the virtual intersection 920c, a significant number of pixels rendered for each of the four line strip elements 910a, 910b, 910c, and 910d display a visual feedback indication of their respective proximities to the virtual intersection 920c, indicating the presence and positions of the four affordances 912a, 912b, 912c, and 912d. The remaining portions of the line strip elements 910a, 910b, and 910c (outside of the radius 922 distance from the virtual intersection 920c) are not visible.

Much as shown in FIG. 8G, in some implementations of FIGS. 9A-9D, pixels rendered for the surface 332 may display a visual feedback indication similar to the visual feedback indication 840 in combination with the visual feedback indications displayed for line strip elements 910a, 910b, 910c, and 910d in FIGS. 9B-9D. In some examples, a line element or line strip element configured to display a visual feedback indication as illustrated in FIGS. 8A-9D may be used to indicate that an affordance, although present, is not currently available for interaction. For example, display of a visual feedback indication by the line strip element 910b could be disabled in response to the affordance 912b being disabled.

Various examples of devices, methods, and/or processes for interacting with virtual environments via hand tracking and/or an MR/VR device are described in connection with FIGS. 8A-9D. These devices, methods, and/or processes may be implemented using and/or in combination with the various devices, systems, elements, and features described above in connection with FIGS. 1-7E.

Figure 10A:
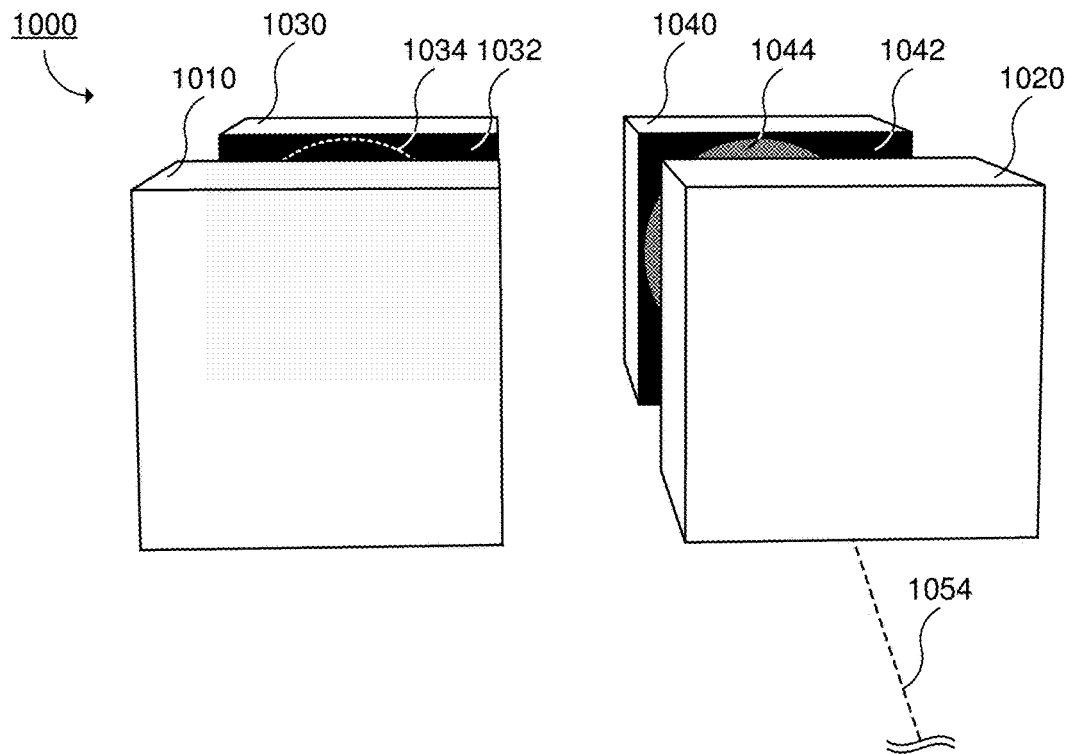
FIGS. 10A and 10B illustrate an example in which the described visual feedback indications, such as the visual feedback indication illustrated in FIG. 5A, improve a user's ability to interact with a virtual environment via changes in pose of the user's hand.
Figure 10B:
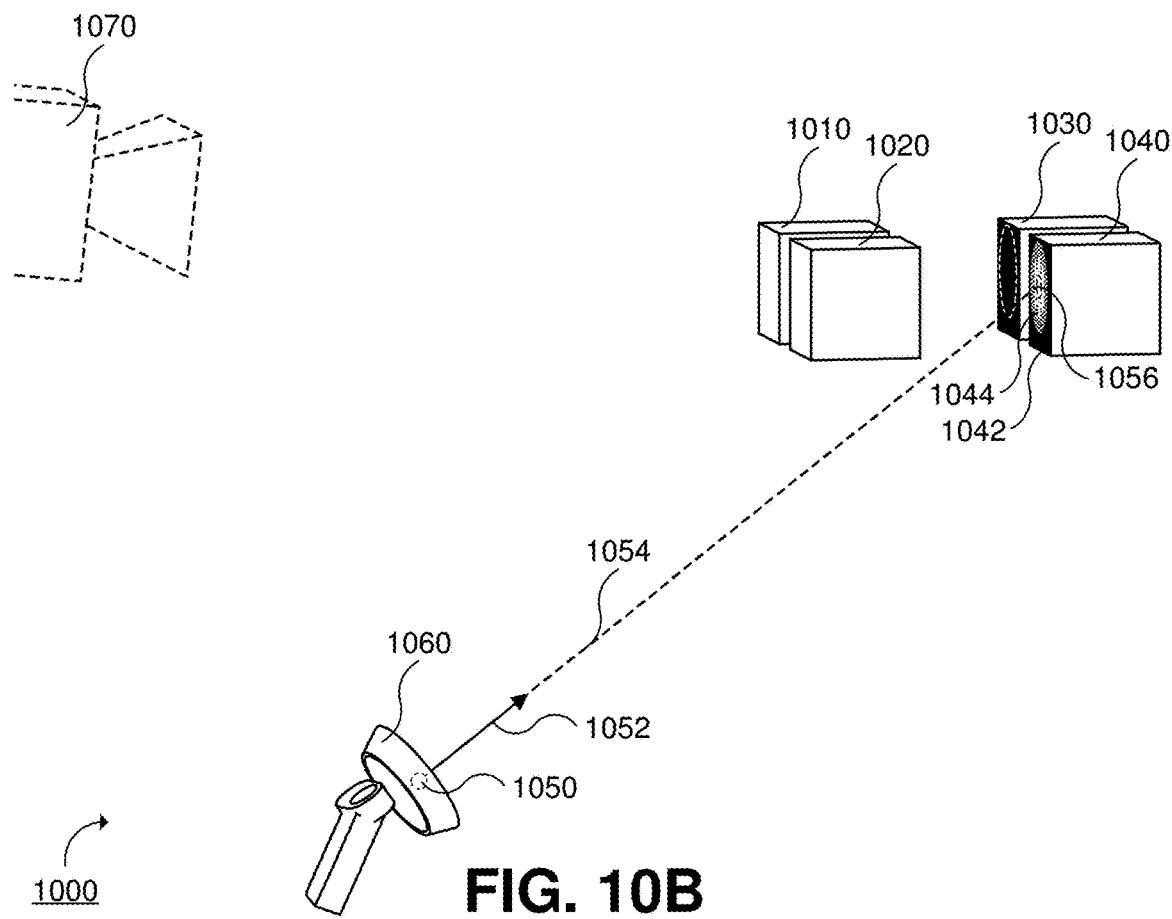

FIGS. 10A and 10B illustrate an example in which the described visual feedback indications, such as the visual feedback indication 510a illustrated in FIG. 5A, improve a user's ability to interact with a virtual environment 1000 via changes in pose of the user's hand. FIG. 10A illustrates a portion of the virtual environment 1000 as rendered from a virtual camera position for display to the user. FIG. 10B illustrates the virtual environment 1000 shown in FIG. 10A as viewed from a different perspective. The virtual environment 1000 includes four interactive virtual objects 1010, 1020, 1030, and 1040, which are not limited to the cube-shaped virtual objects illustrated in FIGS. 10A and 10B. From the position of virtual camera 1070, as illustrated in FIG. 10A, the virtual object 1030 is positioned behind the virtual object 1010, such that the virtual object 1010 obstructs the user's view of most of a surface 1032 of the virtual object 1030 Likewise, the virtual object 1040 is positioned behind the virtual object 1020, such that the virtual object 1020 obstructs the user's view of most of a surface 1042 of the virtual object 1040. In this example, the surfaces 1032 and 1042 would be fully visible and rendered if not obstructed by virtual objects 1010 and 1030. FIG. 10B also illustrates an avatar 1060, similar to the avatar 410 in FIG. 4A, with a corresponding hand motion input source pose 1050, direction vector 1052 representing a direction component of the hand motion input source pose 1050, virtual input line 1054, and virtual intersection 1056 of the virtual input line 1054 with the surface 1042.

Via various conventional approaches, it would be difficult for a user to identify the surface 1042, or a portion of surface 1042, for interaction. For example, there is only a small unobstructed area to target with a gaze pointer, which has a pose corresponding to the pose of the virtual camera 1070. Additionally, targeting of the small obstructed area of surface 1042 is more difficult with a gaze pointer than with changes in hand position, as movement and control of head position used to reorient a gaze pointer are comparatively slower and less precise. In another example, with conventional visual feedback approaches for handheld controllers, although the surface 1042 is unobstructed from the position of hand motion input source pose 1050, the oblique orientation of the surface 1042 to the virtual input line 1054 results in a smaller angular area for targeting the area visible from the virtual camera 1070. Although the remaining portion of the surface 1042 can be targeted from the position of hand motion input source pose 1050, the obstruction of that remaining portion from the user's view, as shown in FIG. 10A, leaves the user with ineffective and uncertain feedback of successful targeting of that remaining portion. Conventional coping mechanisms for these difficulties include changing the position of the virtual camera by moving around to obtain a less obstructed view of the surface 1042, moving the virtual object 1020 to a less obstructing position (which may in turn obstruct another surface, or require later repositioning of the virtual object 1020), and removing virtual object 1020 from the virtual environment 1000. Each of these coping mechanisms slows down interaction with the surface 1042 of interest, and may have other undesired side effects. Similar issues apply to interacting with the surface 1032 obstructed by virtual object 1010.

In contrast, by providing a visual indication 1044 indicating a proximity of virtual input line 1054 to portions of the surface 1042, as in various examples illustrated in FIGS. 5A-9D, the user obtains benefits including an unobstructed view of surface 1042 from the position of hand motion input source pose 1050; speed, dexterity, and precision of hand-based control; visual indication of "near misses" of surface 1042 (see, for example, FIG. 5B); visual indication of successful targeting of some of the obstructed portion of surface 1042; and visual indication of a position of an intersection with surface 1042 based on the visible shape or outline of the rendered visual indication 1044 (for example, based on a visible portion of the shape and distance-based intensity of visual indication 1044, a user may readily infer a position of the obstructed and unrendered virtual intersection 1054 on surface 1042). This enables fast and efficient interaction with virtual objects in the arrangements in, and the positions from, which they are encountered, rather than forcing the user to reposition herself or the virtual objects to effect desired interactions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for interacting with a three-dimensional (3D) virtual environment, the system comprising a head-mounted display device, a logic subsystem, and one or more machine readable media having instructions stored thereon which, when executed by the logic subsystem, cause the system to:
    identify a surface of a virtual object positioned within the 3D virtual environment;
    render, based on the identified surface of the virtual object, a frame depicting the 3D virtual environment and the virtual object, the frame comprising a first pixel;
    receive an input associated with a change in pose of a user's hand;
    estimate, based on at least the received input, a first pose in the 3D virtual environment for an input source associated with the user's hand;
    estimate, based on the first pose in the 3D virtual environment, a virtual input line extending from a position of the first pose in a direction of the first pose;
    estimate, based on the virtual input line, an intersection position on the surface of the virtual object to which the virtual input line extends from the position of the first pose;
    determine whether the first pixel is rendered for a first position on the surface of the virtual object;
    determine a first distance between the first position and the intersection position;
    determine whether the first distance is within a predetermined distance from the intersection position;
    in response to the determining that (i) the first pixel is rendered for the first position on the surface of the virtual object and (ii) the first distance is within the predetermined distance from the intersection position, change a first pixel color rendered for the first pixel based on the first distance between the intersection position and the first position according to a first function of a distance to the intersection position; and
    display, via the head-mounted display device, the frame including the first pixel with the changed first pixel color,
    wherein the frame further includes a second pixel rendered with a second pixel color for a second position within the predetermined distance from the intersection position, the instructions further causing the system to:
        determine whether the second position of the second pixel is on the surface of the virtual object; and
        in response to determining that the second pixel is not on the surface of the virtual object, maintain the second pixel color rendered for the second pixel.

2. The system of claim 1, wherein:
    the frame further includes a third pixel rendered with a third pixel color for a third position on the surface of virtual object, and
    the instructions further cause the system to:
        determine a second distance between the third position and the intersection position;
        determine whether the second distance is within the predetermined distance from the intersection position;
        determine whether the second distance is greater than the first distance; and
        in response to determining that (i) the second distance is within the predetermined distance, and (ii) the second distance is greater than the first distance, change the third pixel color rendered for the third pixel based on the second distance, the change to the third pixel color being less than the change to the first pixel color in response to the second distance being greater than the first distance.

3. The system of claim 2, wherein a luminosity of the changed first pixel color is greater than a luminosity of the changed third pixel color in response to the second distance being greater than the first distance.

4. The system of claim 1, wherein:
the frame further includes a third pixel rendered with a third pixel color for a third position; and
the instructions further cause the system to:
determine that the third position is on the surface of the virtual object;
determine a second distance between the third position and the intersection position;
determine whether the second distance is within the predetermined distance from the intersection position;
determine whether the second distance is less than the first distance; and
in response to determining that (i) the second distance is within the predetermined distance from the intersection position, and (ii) the second distance is less than the first distance, maintain the third pixel color rendered for the third pixel.

5. The system of claim 1, wherein the virtual input line is not visible in the frame.

6. The system of claim 1, wherein the virtual object comprises a line element.

7. The system of claim 1, further comprising a three-dimensional hand motion tracking system adapted to determine the change in pose of the user's hand and generate the input associated with the change in pose of the user's hand.

8. A method of interacting with a three-dimensional (3D) virtual environment, the method comprising:
identifying a surface of a virtual object positioned within the 3D virtual environment;
rendering, based on the identified surface of the virtual object, a frame depicting the 3D virtual environment and the virtual object, the frame comprising a first pixel;
receiving an input associated with a change in pose of a user's hand;
estimating, based on at least the received input, a first pose in the 3D virtual environment for an input source associated with the user's hand;
estimating, based on the first pose in the 3D virtual environment, a virtual input line extending from a position of the first pose in a direction of the first pose;
estimating, based on the virtual input line, an intersection position on the surface of the virtual object to which the virtual input line extends from the position of the first pose;
determining whether the first pixel is rendered for a first position on the surface of the virtual object;
determining a first distance between the first position and the intersection position;
determining whether the first distance is within a predetermined distance from the intersection position;
in response to the determining that (i) the first pixel is rendered for the first position on the surface of the virtual object and (ii) the first distance is within the predetermined distance from the intersection position, changing a first pixel color rendered for the first pixel based on the first distance between the intersection position and the first position according to a first function of a distance to the intersection position; and
displaying, via a display device, the frame including the first pixel with the changed first pixel color,
wherein the frame further includes a second pixel rendered with a second pixel color for a second position within the predetermined distance from the intersection position, the method further comprising:
determining whether the second position of the second pixel is on the surface of the virtual object; and
in response to determining that the second pixel is not on the surface of the virtual object, maintaining the second pixel color rendered for the second pixel.

9. The method of claim 8, wherein:
the frame further includes a third pixel rendered with a third pixel color for a third position on the surface of the virtual object, and
the method further comprises:
determining a second distance between the third position and the intersection position;
determining whether the second distance is within the predetermined distance from the intersection position;
determining whether the distance is greater than the first distance; and
in response to determining that (i) the second distance is within the predetermined distance, and (ii) the second distance is greater than the first distance, changing the third pixel color rendered for the third pixel based on the second distance, the change to the third pixel color being less than the change to the first pixel color in response to the second distance being greater than the first distance.

10. The method of claim 9, wherein a luminosity of the changed first pixel color is greater than a luminosity of the changed third pixel color as a result of the second distance being greater than the first distance.

11. The method of claim 8, wherein:
the frame further includes a third pixel rendered with a third pixel color for a third position; and
the method further comprises:
determining that the third position is on the surface of the virtual object;
determining a second distance between the third position and the intersection position;
determining whether the second distance is within the predetermined distance from the intersection position;
determining whether the second distance is less than the first distance; and
in response to determining that (i) the second distance is within the predetermined distance from the intersection position, and (ii) the second distance is less than the first distance, maintain the third pixel color rendered for the third pixel.

12. The method of claim 8, wherein the virtual input line is not visible in the frame.

13. The method of claim 8, wherein the virtual object comprises a line element.

14. A non-transitory computer readable medium containing instructions which, when executed by a processor, cause a computer to perform functions of:
identifying a surface of a virtual object positioned within a three dimensional (3D) virtual environment;
rendering, based on the identified surface of the virtual object, a frame depicting the 3D virtual environment and the virtual object, the frame comprising a first pixel;
receiving an input associated with a change in pose of a user's hand;
estimating, based on at least the received input, a first pose in the 3D virtual environment for an input source associated with the user's hand;

estimating, based on the first pose in the virtual environment, a virtual input line extending from a position of the first pose in a direction of the first pose;

estimating, based on the virtual input line, an intersection position on the surface of the virtual object to which the virtual input line extends from the position of the first pose;

determining whether the first pixel is rendered for a first position on the surface of the virtual object;

determining a first distance between the first position and the intersection position;

determining whether the first distance is within a predetermined distance from the intersection position;

in response to the determining that (i) the first pixel is rendered for the first position on the surface of the virtual object and (ii) the first distance is within the predetermined distance from the intersection position, changing a first pixel color rendered for the first pixel based on the first distance between the intersection position and the first position according to a first function of a distance to the intersection position; and displaying, via a display device, the frame including the first pixel with the changed first pixel color, wherein the frame further includes a second pixel rendered with a second pixel color for a second position within the predetermined distance from the intersection position, the instructions further causing the system to:

determining that the second position of the second pixel is not on the surface of the virtual object; and in response to determining that the second pixel is not on the surface of the virtual object, maintaining the second pixel color rendered for the second pixel.

15. The non-transitory computer readable medium of claim 14, wherein:

the frame further includes a third pixel rendered with a third pixel color for a third position on the surface of the virtual object, and instructions which, when executed by a processor, further cause the computer to perform functions of:

determining a second distance between the third position and the intersection position;

determining whether the second distance is within the predetermined distance from the intersection position;

determining whether the second distance is greater than the first distance; and in response to determining that (i) the second distance is within the predetermined distance, and (ii) the second distance is greater than the first distance, changing the third pixel color rendered for the third pixel based on the second distance, the change to the third pixel color being less than the change to the first pixel color in response to the second distance being greater than the first distance.

16. The non-transitory computer readable medium of claim 15, wherein a luminosity of the changed first pixel color is greater than a luminosity of the changed third pixel color as a result of the second distance being greater than the first distance.

17. The non-transitory computer readable medium of claim 14, wherein:

the frame further includes a third pixel rendered with a third pixel color for a third position; and instructions which, when executed by a processor, further cause the computer to perform functions of:

determining that the third position is on the surface of the virtual object;

determining a second distance between the second position and the intersection position;

determining whether the second distance is within the predetermined distance from the intersection position;

determining whether the second distance is less than the first distance; and in response to determining that (i) the second distance is within the predetermined distance from the intersection position, and (ii) the second distance is less than the first distance, maintain the third pixel color rendered for the third pixel.

* * * * *